(12) United States Patent
Park et al.

(10) Patent No.: US 11,807,715 B2
(45) Date of Patent: Nov. 7, 2023

(54) RING-OPENING POLYMERIZATIONS USING A FLOW REACTOR

(71) Applicants: International Business Machines Corporation, Armonk, NY (US); The Board of Trustees of the Leland Stanford Junior University, Stanford, CA (US)

(72) Inventors: Nathaniel H. Park, San Jose, CA (US); James L. Hedrick, Pleasanton, CA (US); Victoria A. Piunova, Los Gatos, CA (US); Dmitry Zubarev, San Jose, CA (US); Gavin O. Jones, San Jose, CA (US); Robert M. Waymouth, Palo Alto, CA (US); Binhong Lin, Stanford, CA (US)

(73) Assignees: International Business Machines Corporation, Armonk, NY (US); THE BOARD OF TRUSTEES OF THE LELAND STANFORD JUNIO, Stanford, CA (US)

( * ) Notice: Subject to any disclaimer, the term of this patent is extended or adjusted under 35 U.S.C. 154(b) by 125 days.

(21) Appl. No.: 17/399,533

(22) Filed: Aug. 11, 2021

(65) Prior Publication Data
US 2021/0371583 A1 Dec. 2, 2021

Related U.S. Application Data

(62) Division of application No. 16/028,989, filed on Jul. 6, 2018, now Pat. No. 11,118,008.

(51) Int. Cl.
*C08G 63/82* (2006.01)
*C08G 64/02* (2006.01)
(Continued)

(52) U.S. Cl.
CPC ............ *C08G 63/823* (2013.01); *C08G 6/00* (2013.01); *C08G 63/685* (2013.01);
(Continued)

(58) Field of Classification Search
None
See application file for complete search history.

(56) References Cited

U.S. PATENT DOCUMENTS 3,320,335 A 5/1967 Hedrick et al.
3,558,568 A 1/1971 Kobayashi et al.
(Continued)

FOREIGN PATENT DOCUMENTS

DE 140966 A * 4/1980
JP S63-287948 A 11/1988
(Continued)

OTHER PUBLICATIONS

Decision of Refusal received for Japanese Patent Application Serial No. 2020-532627 dated Jan. 17, 2023, 6 pages.
(Continued)

*Primary Examiner* — Rachel Kahn
(74) *Attorney, Agent, or Firm* — Amin, Turocy & Watson, LLP

(57) ABSTRACT

Techniques regarding the synthesis of one or more polymers through one or more ring-opening polymerizations conducted within a flow reactor and facilitated by one or more anionic catalysts are provided. For example, one or more embodiments can comprise a method, which can comprise polymerizing, via a ring-opening polymerization within a flow reactor, a cyclic monomer in the presence of one or more anionic organocatalysts.

5 Claims, 15 Drawing Sheets

(51) Int. Cl.

| | |
|---|---|
| C08G 79/04 | (2006.01) |
| C08G 75/26 | (2006.01) |
| C08G 67/00 | (2006.01) |
| C08G 63/685 | (2006.01) |
| C08G 64/20 | (2006.01) |
| C08G 63/78 | (2006.01) |
| C08G 64/30 | (2006.01) |
| C08G 6/00 | (2006.01) |

(52) U.S. Cl.
CPC ....... *C08G 63/785* (2013.01); *C08G 64/0208* (2013.01); *C08G 64/205* (2013.01); *C08G 64/30* (2013.01); *C08G 75/26* (2013.01); *C08G 79/04* (2013.01)

(56) References Cited

U.S. PATENT DOCUMENTS

| | | | |
|---|---|---|---|
| 4,349,658 | A | 9/1982 | Mark et al. |
| 4,508,916 | A | 4/1985 | Newell et al. |
| 4,820,757 | A * | 4/1989 | Spang ................ C08K 5/3447 524/106 |
| 8,044,194 | B2 | 10/2011 | Dubois et al. |
| 8,236,902 | B2 | 8/2012 | Hogen-Esch et al. |
| 8,440,176 | B2 | 5/2013 | Aronde et al. |
| 8,829,128 | B2 | 9/2014 | Huhtanen et al. |
| 9,006,337 | B2 | 4/2015 | Zhong et al. |
| 9,108,172 | B2 | 8/2015 | Mattman et al. |
| 9,389,183 | B2 | 7/2016 | Chen et al. |
| 2010/0228060 | A1 | 9/2010 | Angstrom et al. |
| 2010/0305281 | A1 | 12/2010 | Fujiwara et al. |
| 2011/0207887 | A1 | 8/2011 | Duc et al. |
| 2012/0062228 | A1 | 3/2012 | Williamson et al. |
| 2013/0079465 | A1 | 3/2013 | Desbois et al. |
| 2013/0102728 | A1 | 4/2013 | Yang et al. |
| 2016/0289399 | A1 | 10/2016 | Underwood et al. |
| 2017/0240668 | A1 | 8/2017 | Suau et al. |
| 2017/0291971 | A1 | 10/2017 | Serrano et al. |
| 2019/0177466 | A1 | 6/2019 | Hedrick et al. |

FOREIGN PATENT DOCUMENTS

| | | | |
|---|---|---|---|
| JP | H01-168710 A | 7/1989 | |
| JP | H02-187411 A | 7/1990 | |
| JP | 2005-522581 A | 7/2005 | |
| JP | 2007-532572 A | 11/2007 | |
| JP | 2009-237174 A | 10/2009 | |
| JP | 2010-059378 A | 3/2010 | |
| JP | 2010-139822 A | 6/2010 | |
| JP | 2012-048067 A | 3/2012 | |
| JP | 2012-229421 A | 11/2012 | |
| JP | 2013-525409 A | 6/2013 | |
| JP | 2013-527280 A | 6/2013 | |
| JP | 2015-524058 A | 8/2015 | |
| JP | 2015-534598 A | 12/2015 | |
| WO | 9428054 A1 | 12/1994 | |
| WO | 2009/009251 A1 | 1/2009 | |
| WO | 2016/037630 A1 | 3/2016 | |
| WO | 2016/049123 A1 | 3/2016 | |
| WO | 2016/200956 A1 | 12/2016 | |

OTHER PUBLICATIONS

Office Action received for Chinese Patent Application Serial No. 201880073702.9 dated Feb. 15, 2023, 4 pages.
Notice of Reasons for Refusal received for Japanese Patent Application Serial No. 2020-532627 dated Jun. 7, 2022, 13 pages.
Sanders et al., "Synthesis of functionalized cyclic carbonate monomers using a versatile pentafluorophenyl carbonate intermediate", Polymer Chemistry, vol. 5, No. 2, 2014, pp. 327-329.
Rau et al., "Novel High Glass Transition Temperature Polyurethanes Functionalized with Efficient CT Chromophores for Second Order NLO Applications", Molecular Crystals and Liquid Crystals, vol. 446, 2006, pp. 161-174.
McGuirk et al., "Allosteric Regulation of Supramolecular Oligomerization and Catalytic Activity via Coordination—Based Control of Competitive Hydrogen-Bonding Events", Journal of the American Chemical Society, vol. 136, No. 47, pp. 16594-16601.
Babiuch et al., "NMP for preparation of well-defined, pentafluorostyrene-based glycopolymers", Polymer Preprints (American Chemical Society), Division of Polymer Chemistry, vol. 52, No. 2, 2011, pp. 600-601.
Office Action received for Chinese Patent Application Serial No. 201880073702.9 dated Jul. 5, 2022, 5 pages.
Sakakibara et al., "Regioregular Polymerization of Fluorine-Containing Epoxides ", Macromolecules, vol. 40, No. 17, 2007, pp. 6136-6142.
Non-Final Office Action received for U.S. Appl. No. 16/028,989 dated Mar. 30, 2020, 109 pages.
Final Office Action received for U.S. Appl. No. 16/028,919 dated Apr. 9, 2020, 16 pages.
Final Office Action received for U.S. Appl. No. 15/839,420 dated May 19, 2020, 171 pages.
Final Office Action received for U.S. Appl. No. 16/028,989 dated Aug. 25, 2020, 119 pages.
Whitmarsh (Synthesis and Chemical Modification of Polyoxyalkylene Block Copolymers; in Nonionic Surfactants Polyoxyalkylene Block copolymers, edited by Vaughn Nace, Marcel Dekker, 1996, Chapter 1, excerpt pp. 1-4). (Year: 1996).
Hassouna et al., "Phosphazene/triisobutylaluminum-promoted anionic ring-opening polymerization of 1,2-epoxybutane initiated by secondary carbamates", Polymer Chemistry, vol. 8, 2017, pp. 4005-4013.
Hu et al., "Ring-Opening Alternating Copolymerization of Epoxides and Dihydrocoumarin Catalyzed by a Phosphazene Superbase", Macromolecules, vol. 49, 2016, pp. 4462-4472.
Non-Final Office Action received for U.S. Appl. No. 15/839,420 dated Nov. 3, 2020, 218 pages.
STN Search of CAS No. 21634-97-9_Entered Nov. 16, 1984.
Office Action received for Chinese Patent Application Serial No. 201880073702.9 dated Nov. 2, 2022, 4 pages.
Non-Final Office Action received for U.S. Appl. No. 17/018,520 dated Nov. 23, 2021, 36 pages.
Liu, Yata, et al. "A Switch from Anionic to Bifunctional H-Bonding Catalyzed Ring-Opening Polymerizations Towards Polyether-Polyester Diblock Copolymers." Polymer Chemistry 9.2 (2018): 154-159. Polymer Chemistry (RSC Publishing). 4 pages.
Hu, Xin, et al. "Continuous Flow Ring-Opening Polymerizations." Reaction Chemistry & Engineering 2.1 (2017): 20-26. Reaction Chemistry & Engineering (RSC Publishing). 18 pages.
Lin, Binhong, et al. "Organic Ring-Opening Polymerization Catalysts: Reactivity Control by Balancing Acidity." Macromolecules, 2018, 51 (8), pp. 2932-2938. 7 pages.
Lin, Binhong, et al. "Urea Anions: Simple, Fast, and Selective Catalysts for Ring-Opening Polymerizations." J. Am. Chem. Soc., 2017, 139 (4), pp. 1645-1652. 8 pages.
Van Den Berg, Sebastiaan, et al. "Clickable Polylactic Acids by Fast Organocatalytic Ring-Opening Polymerization in Continuous Flow." Macromolecules, 2016. 9 pages.
Melker, Anna, et al. "Continuous Flow Synthesis of P0ly(Methyl Methacrylate) via a Light-Mediated Controlled Radical Polymerization." Journal of Polymer Science Polymer Chemistry. 2015, 53, 2693-2698. 6 pages.
Gutmann, Bernhard, et al. "Continuous-Flow Technology—A Tool for the Safe Manufacturing of Active Pharmaceutical Ingredients." Angew. Chem. Int. Ed. 2015, 54, 6688-6728. 41 pages.
Britton, Joshua, et al. "Multi-Step Continuous-Flow Synthesis." Chem. Soc. Rev. 2017, 46, 1250-1271. 22 pages
Zhang, Xiangyi, et al. "Fast and selective ring-opening polymerizations by alkoxides and thioureas". Nat. Chem. 2016, 8, 1047-1053. 7 pages.
Kamber, Nahrain, et al. "Organocatalytic Ring-Opening Polymerization." Chem. Rev. 2007, 107, 5813-5840. 28 pages.
Zhu, Ning, et al. "Enzymatic Continuous Flow Synthesis of Thiol-Terminated Poly(Valerolactone) and Block Copolymers." Macromolecular Rapid Communications 2018. 6 pages.

(56) References Cited

OTHER PUBLICATIONS

Zhu, Ning, et al. "Sn(OTf)2 Catalyzed Continuous Flow Ring-Opening Polymerization of ε-Caprolactone." RSC Advances, 2015, 5, 31554-31557. 4 pages.
Zhu, Ning, et al. "Continuous Flow Protecting-Group-Free Synthetic Approach to Thiol-Terminated Poly(ε- Caprolactone)." European Polymer Journal 2016, 80, 234-239. 6 pages.
Kundu Santanu, et al. "Continuous Flow Enzyme-Catalyzed Polymerization in a Microreactor." Journal of The American Chemical Society. 2011, 133, 6006-6011. 13 pages.
Reis, Marcus H., et al. "Continuous-Flow Chemistry for the Determination of Comonomer Reactivity Ratios." Polymer Chemistry Jan. 2018. 7 pages.
Abe, Akihiro, et al. "Controlled Polymerization and Polymeric Structures: Flow Microreactor Polymerization, Micelles Kinetics, Polypeptide Ordering, Light Emitting Nanostructures." Advances in Polymer Science 259. 2013. 253 pages.
Leibfarth, Frank A., et al. "Scalable Synthesis of Sequence-Defined, Unimolecular Macromolecules by Flow-IEG." PNAS 2015, 201508599. 6 pages.
Zhu, Ning, et al. "Organocatalyzed Continuous Flow Ring-Opening Polymerizations to Homo- and Block-Polylactones." Polymer 2016, 84, 391-397. 7 pages.
Porta, Riccardo, et al. "Flow Chemistry: Recent Developments in the Synthesis of Pharmaceutical Products." Organic. Process Research & Development. Nov. 2015. 67 pages.
Chen, Mao, et al. "Improving Photo-Controlled Living Radical Polymerization from Trithiocarbonates through the Use of Continuous-Flow Techniques." Chem. Commun. 2015, 51, 6742-6745. 6 pages.
Micic, Nenad, et al. "Scale-up of the Reversible Addition-Fragmentation Chain Transfer (RAFT) Polymerization Using Continuous Flow Processing." Processes 2014, 2, 58-70. 13 pages.
Peng, J., et al. "The in Situ Formation of Nanoparticles via RAFT Polymerization-Induced Self-Assembly in a Continuous Tubular Reactor." Polymer Chemistry 2017, 8, 1495-1506. 14 pages.
Deihl, Christina, et al. "Accelerated Continuous Flow RAFT Polymerization." Macromolecules 2010, 43, 10311-10314. 4 pages.
Ramsey, Bonnie, L., et al. "Photoinduced Organocatalyzed Atom Transfer Radical Polymerization Using Continuous Flow." Macromolecules 2017, 50, 2668-2674. 7 pages.
Parida, Dambarudhar, et al. "Coil Flow Inversion as a Route To Control Polymerization in Microreactors." Macromolecules 2014, 47, 3282-3287. 6 pages.
Morsbach, Jan, et al. "Living Polymer Chains with Predictable Molecular Weight and Dispersity via Carbanionic Polymerization in Continuous Flow: Mixing Rate as a Key Parameter." Macromolecules 2016, 49, 5043-5050. 8 pages.
Mastan, Erlita, et al. "Continuous Production of Multiblock Copolymers in a Loop Reactor: When Living Polymerization Meets Flow Chemistry." Macromolecules 2017. 15 pages.
Natalello, Adrian, et al. "Living Anionic Polymerization in Continuous Flow: Facilitated Synthesis of High-Molecular Weight Poly(2-Vinylpyridine) and Polystyrene." Organic Process Research & Development. Jul. 2014. 7 pages.
Nagaki, Aiichiro "Microflow-System-Controlled Anionic Polymerization of Styrenes." Macromolecules 2008, 41, 6322-6330. 9 pages.
Tonhauser, Christoph, et al. "Microflow Technology in Polymer Synthesis." Macromolecules 2012, 45, 9551- 9570. 20 pages.
Mascia, Salvatore, et al. "End-to-End Continuous Manufacturing of Pharmaceuticals: Integrated Synthesis, Purification, and Final Dosage Formation." Angew. Chem. Int. Ed. 2013, 52, 12359-12363. 6 pages.
Adamo, Andrea, et al. "On-Demand Continuous-Flow Production of Pharmaceuticals in a Compact, Reconfigurable System." Science 2016, 352, 61-67. 8 pages.
Lee, Ashlynn, L. Z., et al. "Injectable biodegradable hydrogels from vitamin D-functionalized polycarbonates for the delivery of avastin with enhanced therapeutic efficiency against metastatic colorectal cancer." Biomacromolecules 16, 465-75 (2015). 11 pages.
Nederberg, Fredrik, et al. "Biodegradable nanostructures with selective lysis of microbial membranes." Nature Chemistry, 409-14, Apr. 3, 2011. 6 pages.
Ono, Robert J., et al. "Benzyl chloride-functionalized polycarbonates: a versatile platform for the synthesis of functional biodegradable polycarbonates." Macromolecules 47, 7725-7731 (2014).
Park, Nathaniel H., et al. "Expanding the cationic polycarbonate platform: attachment of sulfonium moieties by postpolymerization ring opening of epoxides." ACS Macro Lett. 5, 1247-1252 (2016). 6 pages.
Isik, Mehmet, et al. Tuning the Selectivity of Biodegradable Antimicrobial Cationic Polycarbonates by Exchanging the Counter-Anion. Macromolecular Bioscience (2016). 8 pages.
Kubo, Tomohiro, et al. "Multifunctional homopolymers: postpolymerization modification via sequential nucleophilic aromatic substitution." Macromolecules (2016). 8 pages.
Spokoyny, Alexander M., et al. "A perfluoroaryl-cysteine S(N)Ar chemistry approach to unprotected peptide stapling." Journal of the American Chemical Society, 135, 5946-5949 (2013). 4 pages.
Park, Nathaniel H., et al. Organocatalyzed synthesis of fluorinated poly(aryl thioethers). Nature Communications. vol. 8, Issue 1, Dec. 2017. 7 pages.
Pratt, Russell C., et al. Exploration, optimization, and application of supramolecular thiourea—amine catalysts for the synthesis of lactide (co)polymers. Macromolecules vol. 39, 7863-7871 (2006). 9 pages.
Hall, Synthesis, Characterization, and Polymerization of Sulfonamide Based Bifunctional Monomers, 2016, 83 pages.
Quast et al., Hyperbranched Polyfluorinated benzyl ether polymers: Mechanism, kinetics, and optimization, Journal of Polymer Science Part A: Polymer Chemistry, 2014, pp. 985-994, vol. 52.
Chan et al., Chemically modifiable N-heterocycle-functionalized polycarbonates as a platform for diverse smart biomimetic nanomaterials, Chemical Science, 2014, pp. 3294-3300, vol. 5.
Mell, Peter, et al. "The NIST Definition of Cloud Computing." National Institute of Standards and Technology. Sep. 2011. 7 pages.
International Search Report and Written Opinion received for PCT Application Serial No. PCT/IB2018/059556, dated Mar. 20, 2019, 9 pages.
Non-Final Office Action received for U.S. Appl. No. 15/839,420 dated Jan. 30, 2020, 92 pages.
Non-Final Office Action received for U.S. Appl. No. 16/028,919 dated Feb. 14, 2020, 32 pages.
Notice of Allowance received for U.S. Appl. No. 16/029,025 dated Feb. 6, 2020, 56 pages.

* cited by examiner

SELECTING AN ANIONIC ORGANOCATALYST FROM A PLURALITY OF ANIONIC ORGANOCATALYSTS BASED ON A REACTIVITY RATE OF A CYCLIC MONOMER, WHEREIN THE ORGANOCATALYST IS CHARACTERIZED BY THE CHEMICAL STRUCTURE:

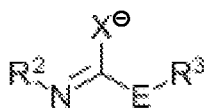

WHEREIN X CORRESPONDS TO AN ANION SELECTED FROM A FIRST GROUP CONSISTING OF AN OXYGEN ANION, A SULFUR ANION, AND A NITROGEN ANION; WHEREIN E CORRESPONDS TO AN ATOM SELECTED FROM A SECOND GROUP CONSISTING OF AN OXYGEN ATOM AND A SULFUR ATOM; WHEREIN $R^2$ CORRESPONDS TO A FIRST FUNCTIONAL GROUP SELECTED FROM A THIRD GROUP CONSISTING OF A FIRST ALKYL GROUP AND A FIRST ARYL GROUP; AND WHEREIN $R^3$ CORRESPONDS TO A SECOND FUNCTIONAL GROUP SELECTED FROM A FOURTH GROUP CONSISTING OF A SECOND ALKYL GROUP AND A SECOND ARYL GROUP

— 1102

POLYMERIZING, VIA A RING-OPENING POLYMERIZATION WITHIN A FLOW REACTOR, THE CYCLIC MONOMER IN THE PRESENCE OF THE SELECTED ANIONIC ORGANOCATALYST

— 1104

REACTING, VIA A SECOND RING-OPENING POLYMERIZATION WITHIN THE FLOW REACTOR, AN INTERMEDIATE POLYMER WITH A SECOND CYCLIC MONOMER IN THE PRESENCE OF A CHEMICAL COMPOUND TO FORM A BLOCK COPOLYMER, WHEREIN THE INTERMEDIATE POLYMER IS FORMED FROM THE POLYMERIZING THE CYCLIC MONOMER.

┌─ 1202: SELECTING AN ANIONIC ORGANOCATALYST FROM A PLURALITY OF ANIONIC ORGANOCATALYSTS BASED ON A REACTIVITY RATE OF A CYCLIC MONOMER, WHEREIN THE ORGANOCATALYST IS CHARACTERIZED BY THE CHEMICAL STRUCTURE:

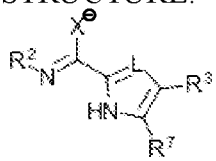

WHEREIN X CORRESPONDS TO AN ANION SELECTED FROM A FIRST GROUP CONSISTING OF AN OXYGEN ANION, A SULFUR ANION, AND A NITROGEN ANION; WHEREIN L CORRESPONDS TO AN ATOM SELECTED FROM A SECOND GROUP CONSISTING OF A CARBON ATOM AND A NITROGEN ATOM; WHEREIN $R^2$ CORRESPONDS TO A FIRST FUNCTIONAL GROUP SELECTED FROM A THIRD GROUP CONSISTING OF A FIRST ALKYL GROUP AND A FIRST ARYL GROUP; WHEREIN $R^3$ CORRESPONDS TO A SECOND FUNCTIONAL GROUP SELECTED FROM A FOURTH GROUP CONSISTING OF A SECOND ALKYL GROUP AND A SECOND ARYL GROUP ; WHEREIN $R^7$ CORRESPONDS TO A THIRD FUNCTIONAL GROUP SELECTED FROM A FIFTH GROUP CONSISTING OF A THIRD ALKYL GROUP AND A THIRD ARYL GROUP

1204: POLYMERIZING, VIA A RING-OPENING POLYMERIZATION WITHIN A FLOW REACTOR, THE CYCLIC MONOMER IN THE PRESENCE OF THE SELECTED ANIONIC ORGANOCATALYST

1206: REACTING, VIA A SECOND RING-OPENING POLYMERIZATION WITHIN THE FLOW REACTOR, AN INTERMEDIATE POLYMER WITH A SECOND CYCLIC MONOMER IN THE PRESENCE OF A CHEMICAL COMPOUND TO FORM A BLOCK COPOLYMER, WHEREIN THE INTERMEDIATE POLYMER IS FORMED FROM THE POLYMERIZING THE CYCLIC MONOMER.

SELECTING AN ANIONIC ORGANOCATALYST FROM A PLURALITY OF ANIONIC ORGANOCATALYSTS BASED ON A REACTIVITY RATE OF A CYCLIC MONOMER, WHEREIN THE ORGANOCATALYST IS CHARACTERIZED BY THE CHEMICAL STRUCTURE:

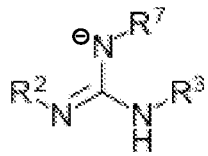

WHEREIN $R^2$ CORRESPONDS TO A FIRST FUNCTIONAL GROUP SELECTED FROM A FIRST GROUP CONSISTING OF A FIRST ALKYL GROUP AND A FIRST ARYL GROUP; WHEREIN $R^3$ CORRESPONDS TO A SECOND FUNCTIONAL GROUP SELECTED FROM A SECOND GROUP CONSISTING OF A SECOND ALKYL GROUP AND A SECOND ARYL GROUP; AND WHEREIN $R^7$ CORRESPONDS TO A THIRD FUNCTIONAL GROUP SELECTED FROM A THIRD GROUP CONSISTING OF A THIRD ALKYL GROUP AND A THIRD ARYL GROUP
— 1302

POLYMERIZING, VIA A RING-OPENING POLYMERIZATION WITHIN A FLOW REACTOR, THE CYCLIC MONOMER IN THE PRESENCE OF THE SELECTED ANIONIC ORGANOCATALYST
— 1304

REACTING, VIA A SECOND RING-OPENING POLYMERIZATION WITHIN THE FLOW REACTOR, AN INTERMEDIATE POLYMER WITH A SECOND CYCLIC MONOMER IN THE PRESENCE OF A CHEMICAL COMPOUND TO FORM A BLOCK COPOLYMER, WHEREIN THE INTERMEDIATE POLYMER IS FORMED FROM THE POLYMERIZING THE CYCLIC MONOMER.
— 1306

1402 — SELECTING AN ANIONIC ORGANOCATALYST FROM A PLURALITY OF ANIONIC ORGANOCATALYSTS BASED ON A REACTIVITY RATE OF A CYCLIC MONOMER, WHEREIN THE ORGANOCATALYST IS CHARACTERIZED BY THE CHEMICAL STRUCTURE:

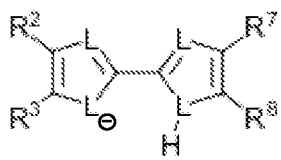

WHEREIN L CORRESPONDS TO AN ANION SELECTED FROM A FIRST GROUP CONSISTING OF A CARBON ANION AND A NITROGEN ANION; WHEREIN $R^2$ CORRESPONDS TO A FIRST FUNCTIONAL GROUP SELECTED FROM A SECOND GROUP CONSISTING OF A FIRST ALKYL GROUP AND A FIRST ARYL GROUP; WHEREIN $R^3$ CORRESPONDS TO A SECOND FUNCTIONAL GROUP SELECTED FROM A THIRD GROUP CONSISTING OF A SECOND ALKYL GROUP AND A SECOND ARYL GROUP; WHEREIN $R^7$ CORRESPONDS TO A THIRD FUNCTIONAL GROUP SELECTED FROM A FOURTH GROUP CONSISTING OF A THIRD ALKYL GROUP AND A THIRD ARYL GROUP; AND WHEREIN $R^8$ CORRESPONDS TO A FOURTH FUNCTIONAL GROUP SELECTED FROM A FIFTH GROUP CONSISTING OF A FOURTH ALKYL GROUP AND A FOURTH ARYL GROUP

1404 — POLYMERIZING, VIA A RING-OPENING POLYMERIZATION WITHIN A FLOW REACTOR, THE CYCLIC MONOMER IN THE PRESENCE OF THE SELECTED ANIONIC ORGANOCATALYST

1406 — REACTING, VIA A SECOND RING-OPENING POLYMERIZATION WITHIN THE FLOW REACTOR, AN INTERMEDIATE POLYMER WITH A SECOND CYCLIC MONOMER IN THE PRESENCE OF A CHEMICAL COMPOUND TO FORM A BLOCK COPOLYMER, WHEREIN THE INTERMEDIATE POLYMER IS FORMED FROM THE POLYMERIZING THE CYCLIC MONOMER.

```
┌─────────────────────────────────────────────────┐
│ SELECTING AN ANIONIC ORGANOCATALYST FROM A      │
│ PLURALITY OF ANIONIC ORGANOCATALYSTS BASED ON A │
│ REACTIVITY RATE OF A CYCLIC MONOMER, WHEREIN THE│
│ ORGANOCATALYST IS CHARACTERIZED BY THE CHEMICAL │
│                  STRUCTURE:                     │
```

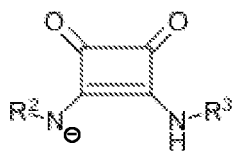

WHEREIN $R^2$ CORRESPONDS TO A FIRST FUNCTIONAL GROUP SELECTED FROM A FIRST GROUP CONSISTING OF A FIRST ALKYL GROUP AND A FIRST ARYL GROUP; AND WHEREIN $R^3$ CORRESPONDS TO A SECOND FUNCTIONAL GROUP SELECTED FROM A SECOND GROUP CONSISTING OF A SECOND ALKYL GROUP AND A SECOND ARYL GROUP.

← 1502

POLYMERIZING, VIA A RING-OPENING POLYMERIZATION WITHIN A FLOW REACTOR, THE CYCLIC MONOMER IN THE PRESENCE OF THE SELECTED ANIONIC ORGANOCATALYST

← 1504

REACTING, VIA A SECOND RING-OPENING POLYMERIZATION WITHIN THE FLOW REACTOR, AN INTERMEDIATE POLYMER WITH A SECOND CYCLIC MONOMER IN THE PRESENCE OF A CHEMICAL COMPOUND TO FORM A BLOCK COPOLYMER, WHEREIN THE INTERMEDIATE POLYMER IS FORMED FROM THE POLYMERIZING THE CYCLIC MONOMER.

← 1506

RING-OPENING POLYMERIZATIONS USING A FLOW REACTOR

BACKGROUND

The subject disclosure relates to the use of a flow reactor to facilitate one or more ring-opening polymerizations, and more specifically, to using one or more flow reactors to facilitate one or more ring-opening polymerizations comprising an anionic organocatalyst.

The United States federal government publishes regulations (e.g., Good Manufacturing Practices (GMP)) to ensure the quality of pharmaceutical compounds, medical devices, and/or food. These regulations can regard the manufacturing, processing, packaging, and/or formulation of various products. Moreover, these regulations address issues of production, starting materials, sanitation, cleanliness of equipment, and/or monitoring through requisite tests. To meet these regulations, traditional industrialization techniques in the chemical industry have included batch processing, in which a series of operations are carried out over a period of time on a separate, identifiable item or parcel of material. Numerous chemical process industries retain batch processing as their primary method of manufacture. For example, products traditionally manufactured by batch processing can include pharmaceuticals, agrochemicals, dyestuffs, food additives, vitamins, and/or the like. For instance, numerous polymers, such as polyesters and/or polycarbonates, have been traditionally manufactured using batch processing.

However, batch processing can be time-consuming, require the design of manufacturing stages that can be difficult to reproduce, can necessitate adverse safety conditions (e.g., due to the transportation of chemicals and/or storage of volatile chemicals), can require a large labor force, and/or can be difficult to automate.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, apparatuses, and/or methods that can regard one or more ring-opening polymerizations within one or more flow reactors are described.

According to an embodiment, a method is provided. The method can comprise polymerizing, via a ring-opening polymerization within a flow reactor, a cyclic monomer in the presence of an anionic organocatalyst characterized by a chemical structure:

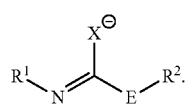

The "X" can correspond to an anion selected from a first group consisting of an oxygen anion, a sulfur anion, and a nitrogen anion. The "E" can correspond to an atom selected from a second group consisting of an oxygen atom and a sulfur atom. The "$R^1$" can correspond to a first functional group selected from a third group consisting of a first alkyl group and a first aryl group. The "$R^2$" can correspond to a second functional group selected from a fourth group consisting of a second alkyl group and a second aryl group. An advantage of such a method can include the implementation of continuous processing to increase chemical reaction rates, as compared to traditional techniques.

In some examples, the method can comprise reacting, via a second ring-opening polymerization within the flow reactor, an intermediate polymer with a second cyclic monomer in the presence of a chemical compound to form a block copolymer. The intermediate polymer can be formed from the polymerizing the cyclic monomer. An advantage of such a method can include the implementation of continuous processing to manufacture one or more copolymers (e.g., block copolymers).

According to another embodiment, a method is provided. The method can comprise polymerizing, via a ring-opening polymerization within a flow reactor, a cyclic monomer in the presence of an anionic organocatalyst characterized by a chemical structure:

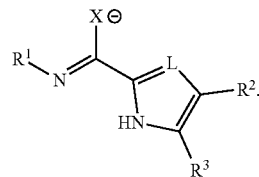

The "X" can correspond to an anion selected from a first group consisting of an oxygen anion, a sulfur anion, and a nitrogen anion. The "L" can correspond to an atom selected from a second group consisting of a carbon atom and a nitrogen atom. The "$R^1$" can correspond to a first functional group selected from a third group consisting of a first alkyl group and a first aryl group. The "$R^2$" can correspond to a second functional group selected from a fourth group consisting of a second alkyl group and a second aryl group. The "$R^3$" can correspond to a third functional group selected from a fifth group consisting of a third alkyl group and a third aryl group. An advantage of such a method can include the implementation of continuous processing to achieve manufacturing techniques that are highly reproducible, as compared to traditional industrialize polymerizations.

In some examples, the method can comprise reacting, via a second ring-opening polymerization within the flow reactor, an intermediate polymer with a second cyclic monomer in the presence of a chemical compound to form a block copolymer. The intermediate polymer can be formed from the polymerizing the cyclic monomer. An advantage of such a method can be that an active catalyst can be switched during continuous processing of a copolymer to facilitate varying chemical reaction rates.

According to another embodiment, a method is provided. The method can comprise polymerizing, via a ring-opening polymerization within a flow reactor, a cyclic monomer in the presence of an anionic organocatalyst characterized by a chemical structure:

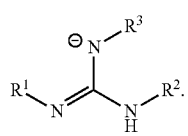

The "$R^1$" can correspond to a first functional group selected from a first group consisting of a first alkyl group and a first aryl group. The "$R^2$" can correspond to a second functional group selected from a second group consisting of a second alkyl group and a second aryl group. The "$R^3$" can correspond to a third functional group selected from a third group consisting of a third alkyl group and a third aryl group. An advantage of such a method can include the utilization of one or more anionic organocatalysts with varying catalytic reactivity.

In some examples, the method can comprise reacting, via a second ring-opening polymerization within the flow reactor, an intermediate polymer with a second cyclic monomer in the presence of a chemical compound to form a block copolymer. The intermediate polymer can be formed from the polymerizing the cyclic monomer. An advantage of such a method can be that an active catalyst can be switched based on the catalyst activity of available anionic organocatalysts.

According to another embodiment, a method is provided. The method can comprise polymerizing, via a ring-opening polymerization within a flow reactor, a cyclic monomer in the presence of an anionic organocatalyst characterized by a chemical structure:

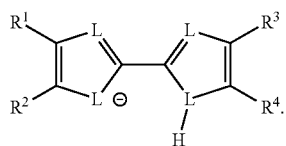

The "L" can correspond to an atom selected from a first group consisting of a carbon atom and a nitrogen atom. The "$R^1$" can correspond to a first functional group selected from a second group consisting of a first alkyl group and a first aryl group. The "$R^2$" can correspond to a second functional group selected from a third group consisting of a second alkyl group and a second aryl group. The "$R^3$" can correspond to a third functional group selected from a fourth group consisting of a third alkyl group and a third aryl group. The "$R^4$" can correspond to a fourth functional group selected from a fifth group consisting of a fourth alkyl group and a fourth aryl group. An advantage of such a method can be that polymerization conditions can be optimized through the use of various anionic organocatalysts, which can be characterized by the above structure, having various catalytic activities.

In some examples, the method can comprise reacting, via a second ring-opening polymerization within the flow reactor, an intermediate polymer with a second cyclic monomer in the presence of a chemical compound to form a block copolymer. The intermediate polymer can be formed from the polymerizing the cyclic monomer. An advantage of such a method can be that copolymers can be formed more quickly than can otherwise achieved by using conventional techniques.

According to another embodiment, a method is provided. The method can comprise polymerizing, via a ring-opening polymerization within a flow reactor, a cyclic monomer in the presence of an anionic organocatalyst characterized by a chemical structure:

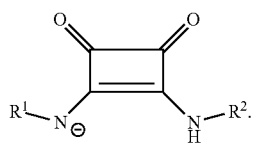

The "$R^1$" can correspond to a first functional group selected from a first group consisting of a first alkyl group and a first aryl group. The "$R^2$" can correspond to a second functional group selected from a second group consisting of a second alkyl group and a second aryl group. An advantage of such a method can be that the anionic catalyst can facilitate polymerization rates that can be substantially shorter than reaction rates achieved via traditional polymerization conditions.

In some examples, the method can comprise reacting, via a second ring-opening polymerization within the flow reactor, an intermediate polymer with a second cyclic monomer in the presence of a chemical compound to form a block copolymer. The intermediate polymer can be formed from the polymerizing the cyclic monomer. An advantage of such a method can be that chemical production costs can be reduced by the subject polymerization and/or reacting at least because traditional, expensive laboratory equipment is not necessitated.

BRIEF DESCRIPTION OF THE DRAWINGS

FIG. 11 illustrates a flow diagram of an example, non-limiting method that can facilitate forming a polymer (e.g., a block copolymer) via a one or more ring-opening polymerization within one or more flow reactors, wherein the one or more ring-opening polymerizations can be facilitated by a changing an active catalyst from one anionic catalyst to another anionic catalyst in accordance with one or more embodiments described herein.

FIG. 12 illustrates a flow diagram of an example, non-limiting method that can facilitate forming a polymer (e.g., a block copolymer) via a one or more ring-opening polymerization within one or more flow reactors, wherein the one or more ring-opening polymerizations can be facilitated by a changing an active catalyst from one anionic catalyst to another anionic catalyst in accordance with one or more embodiments described herein.

FIG. 13 illustrates a flow diagram of an example, non-limiting method that can facilitate forming a polymer (e.g., a block copolymer) via a one or more ring-opening polymerization within one or more flow reactors, wherein the one or more ring-opening polymerizations can be facilitated by a changing an active catalyst from one anionic catalyst to another anionic catalyst in accordance with one or more embodiments described herein.

FIG. 14 illustrates a flow diagram of an example, non-limiting method that can facilitate forming a polymer (e.g., a block copolymer) via a one or more ring-opening polymerization within one or more flow reactors, wherein the one or more ring-opening polymerizations can be facilitated by a changing an active catalyst from one anionic catalyst to another anionic catalyst in accordance with one or more embodiments described herein.

FIG. 15 illustrates a flow diagram of an example, non-limiting method that can facilitate forming a polymer (e.g., a block copolymer) via a one or more ring-opening polymerization within one or more flow reactors, wherein the one or more ring-opening polymerizations can be facilitated by a changing an active catalyst from one anionic catalyst to another anionic catalyst in accordance with one or more embodiments described herein.

DETAILED DESCRIPTION

Figure 1:
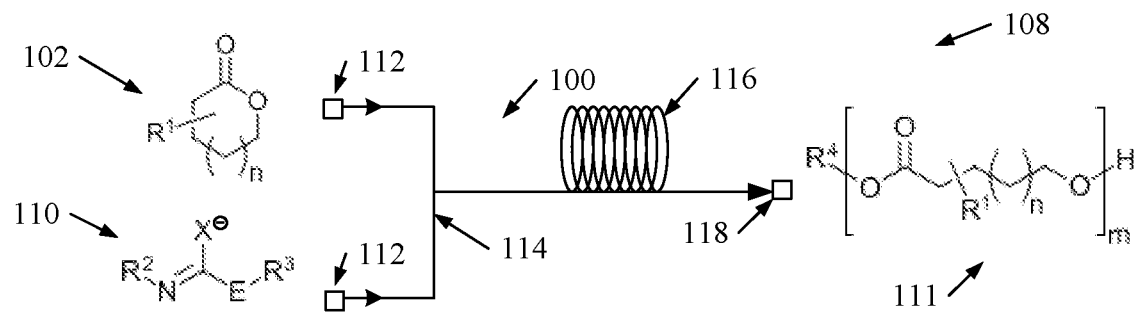
FIG. 1 illustrates a diagram of example, non-limiting polymerization schemes that can comprise one or more ring-opening polymerizations within one or more flow reactors in accordance with one or more embodiments described herein.
Figure 1:
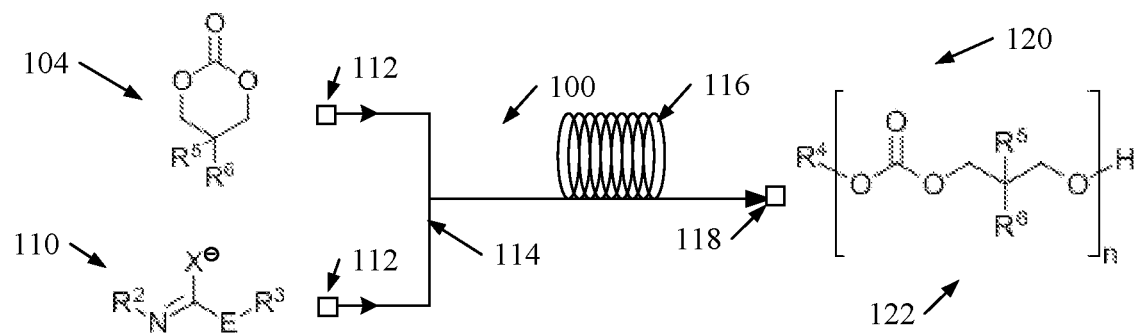
Figure 1:
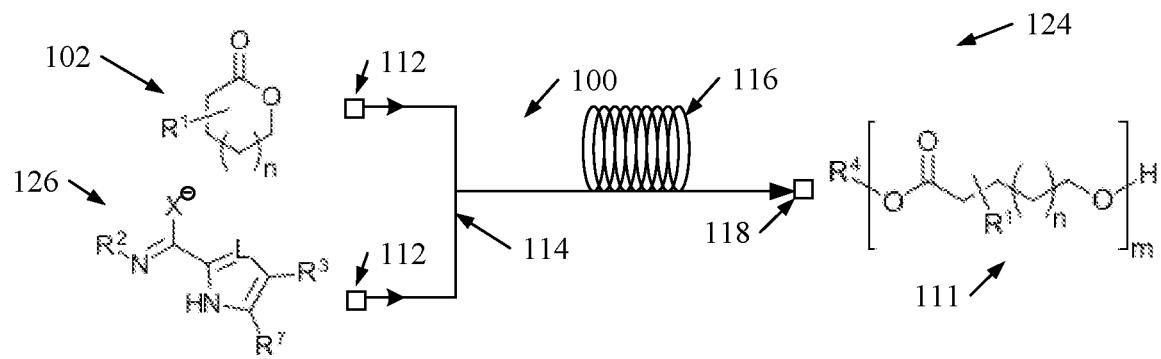
Figure 1:
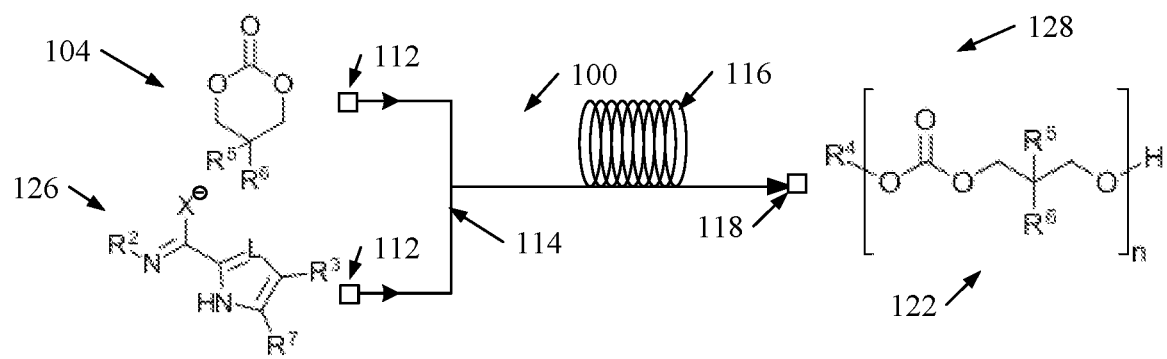

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Given the above problems with conventional techniques for polymerizing chemical compounds with batch processing; the present disclosure can be implemented to produce a solution to one or more of these problems in the form of a continuous production technique that can utilize organocatalysts within a flow reactor to produce one or more polymers (e.g., polyesters and/or polycarbonates). Continuous flow production techniques can take advantage of miniaturization, improved kinetic control, and/or expanded temperature ranges to circumvent many of the disadvantages associated with batch processing (e.g., long production times associated with heating and/or cooling batch reactors). Thus, continuous flow production designs can allow for: effective heat transfer, effective mixing, waste minimization, real time analysis, cleaner chemical products, novel chemical reactions, ease of scalability, and/or short reaction times. Further, one or more systems described herein can advantageously control and/or manipulate polymerization conditions of a flow reactor to: solve problems of reproducibility traditionally exhibited by batch processing, optimize polymerization conditions, and/or facilitate discovery of novel chemical compounds.

One or more embodiments described herein can regard forming homopolymers (e.g., polyesters and/or polycarbonates) via one or more ring-opening polymerizations ("ROP") conducted within one or more flow reactors. For example, the one or more ROPs can comprise polymerizing one or more cyclic monomers (e.g., one or more lactone monomers and/or one or more cyclic carbonate monomers) in the presence of an anionic catalyst (e.g., derived from a reaction with a chemical base). Thus, one or more embodiments can regard a continuous flow production of polymers (e.g., polyesters and/or polycarbonates) via one or more ROPs within one or more flow reactors; wherein, as compared to traditional batch production techniques, the continuous flow production can achieve faster reaction times, a narrower dispersity of polymers, and/or tunable control over molecular weight distributions.

Additionally, use of the anionic catalysts described herein can provide a wide range of organocatalyst compounds, which can thereby provide a wide range of available catalytic activity. One or more embodiments can regard utilizing the wide range of available catalytic activity to facilitate the formation of multiblock copolymers via continuous flow productions, such as multiple ROPs within one or more flow reactors. For example, a first block of a given block copolymer can be polymerized via ROP within a flow reactor, which can be facilitated by a first anionic catalyst. A second block of the given block copolymer can be polymerized via another ROP within the flow reactor, which can be facilitated by a second anionic catalyst. A switch of the active catalyst from the first anionic catalyst to the second anionic catalyst can be performed via a proton transfer reaction conducted within the flow reactor. By switching the active catalyst, the catalytic activity within the flow reactor can be adjusted based on the cyclic monomer subject to ROP, wherein different cyclic monomers can be subject to ROP at different stages of flow through the flow reactor. In other words, a stream of chemical reactants can flow through the flow reactor thereby undergoing one or more ROPs to form a multiblock copolymer, wherein one or more additional chemical reactants can be injected into the flowing stream to facilitate formation of a block of the copolymer and/or a switch of the active catalyst.

As used herein, the term "flow reactor" can refer to a device in which one or more chemical reactions can take place within one or more channels (e.g., microfluidic channels). For example, a flow reactor can facilitate continuous flow production, as opposed to batch production. One or more streams of chemical reactants can flow (e.g., continuously) through the one or more channels of the flow reactor, wherein one or more chemical reactions (e.g., polymerizations, protonations, and/or deprotonations) involving the chemical reactants can occur within the one or more channels as the one or more streams flow.

As used herein, the term "anionic catalyst" can refer to an organocatalyst comprising one or more anions that can be formed from a deprotonation of one or more nitrogen-hydrogen bonds. For example, an anionic catalyst can comprise a molecular backbone having one or more anionic groups bonded (e.g., covalently) to one or more functional groups.

Figure 2:
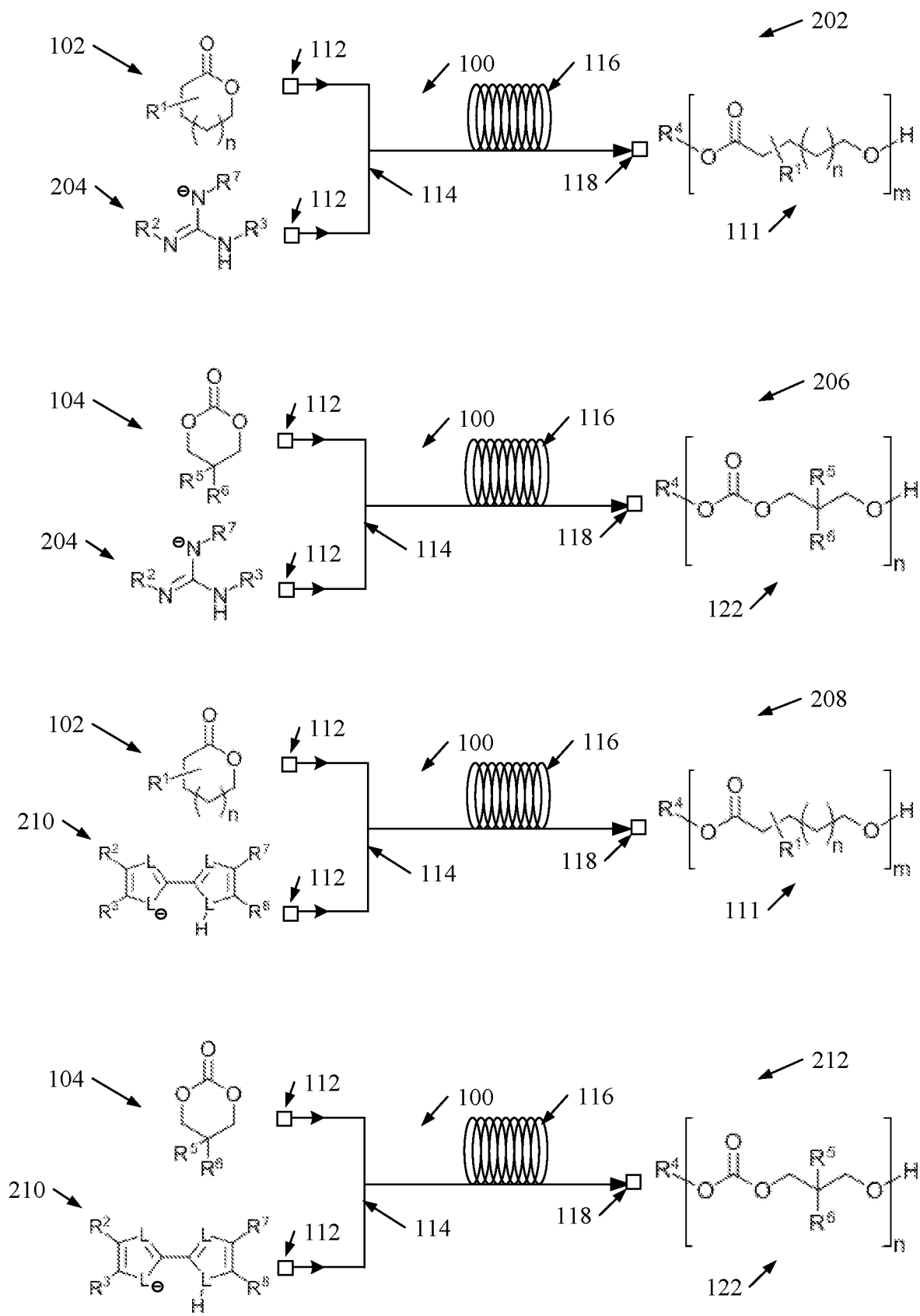
FIG. 2 illustrates a diagram of example, non-limiting polymerization schemes that can comprise one or more ring-opening polymerizations within one or more flow reactors in accordance with one or more embodiments described herein.
Figure 3:
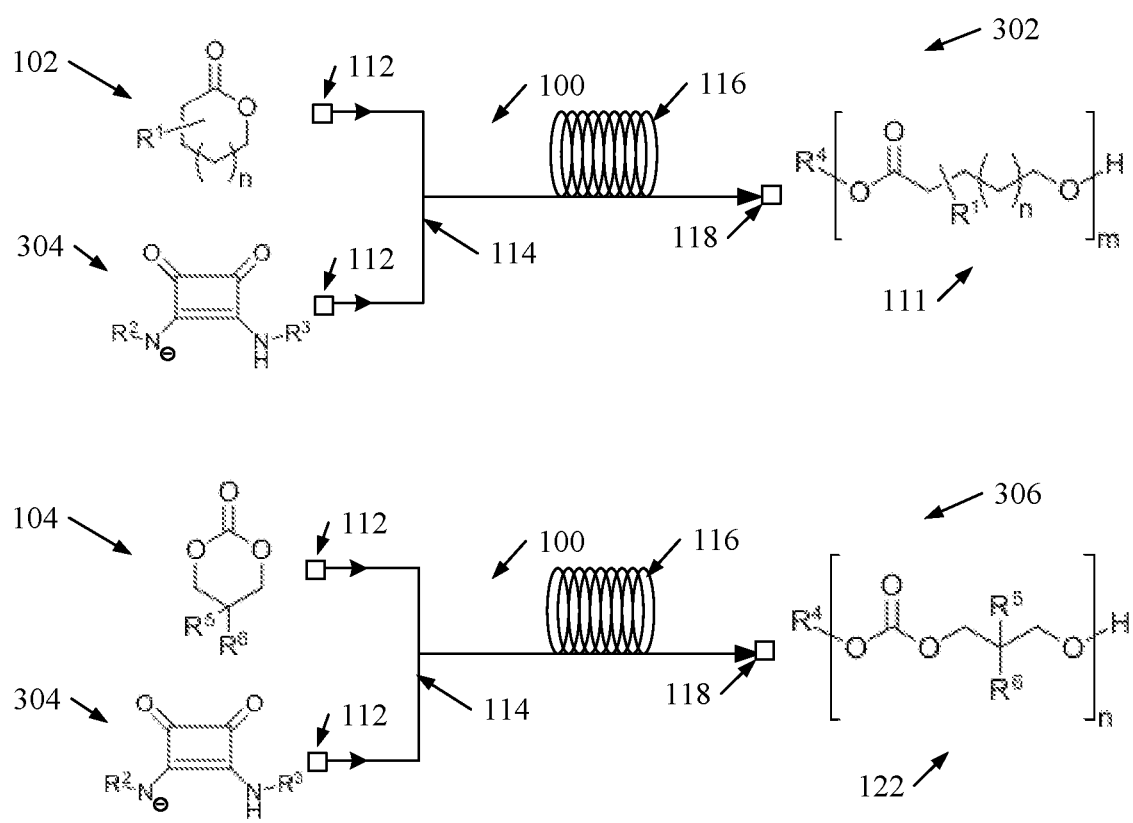
FIG. 3 illustrates a diagram of example, non-limiting polymerization schemes that can comprise one or more ring-opening polymerizations within one or more flow reactors in accordance with one or more embodiments described herein.

FIGS. 1-3 illustrate diagrams of example, non-limiting polymerization schemes that can facilitate ROP of one or more cyclic monomers within one or more flow reactors 100 in accordance with one or more embodiments described herein. For example, the plurality of polymerization schemes depicted in FIGS. 1-3 can comprise ROP of lactone monomers 102 and/or cyclic carbonate monomers 104 within one or more flow reactors 100 (e.g., via a continuous flow production). Catalyst choice can directly affect the control over the one or more ROPs as well as the potential for deleterious transesterification reactions on the molecular backbone of produced polymers (e.g., homopolymers and/or copolymers), causing a broadening of the molecular weight distribution. Additionally, catalyst choice can determine the kinetics of polymerization and hence the residence times in the one or more flow reactors, affecting overall reactor throughput.

The one or more ROPs depicted via the polymerization schemes of FIGS. 1-3 can comprise one or more anionic catalysts. The variety of anionic catalysts can afford high selectivity and/or control over the ROPs within the one or more flow reactors 100. Additionally, carious anionic catalysts can exhibit very fast kinetics of polymerization, thereby potentially allowing for very short reactor residence times. Moreover, the reactivity of one or more cyclic monomers (e.g., one or more lactone monomers 102 and/or one or more cyclic carbonate monomers 104) can be matched with an appropriate anionic catalyst to facilitate controlled polymerization and minimization of molecular backbone transesterification.

Additionally, the one or more ROPs depicted via the polymerization schemes of FIGS. 1-3 can be performed at room temperature. Further, the one or more ROPs depicted via the polymerization schemes of FIGS. 1-3 can be characterized by residence times within the one or more flow reactors 100 ranging from, for example, greater than or equal to 0.006 seconds and less than or equal to 3.5 seconds. Moreover, the one or more ROPs depicted via the polymerization schemes of FIGS. 1-3 can produce products characterized by narrow molecular weight distributions (Đ) ranging from, for example, greater than or equal to 1.07 and less than or equal to 1.15. The one or more lactone monomers 102 can comprise one or more first functional groups (e.g., represented by "$R^1$"). Example first functional groups can include, but are not limited to: alkyl groups, aryl groups, substituted aryl groups, trifluoromethyl groups, phenyl groups, a combination thereof, and/or the like. Example lactone monomers 102 can include, but are not limited to: ε-caprolactone, δ-valerolactone, iPr-phosphonate, and/or lactide. One of ordinary skill in the art will recognize that the chemical structure for the one or more lactone monomers 102 shown in FIGS. 1-3 is exemplary and the one or more lactone monomers 102 can be characterized by a wide variety of chemical structures that comprise an ester group as part of a ring formation.

FIG. 1 depicts a first polymerization scheme 108 can comprise ROP of one or more lactone monomers 102 in the presence of one or more first anionic catalysts 110 (e.g., derived from and/or one or more chemical bases) to produce one or more polyesters 111. In one or more embodiments, the one or more first anionic catalysts 110 can be derived from the one or more chemical bases. The one or more chemical bases depicted in FIGS. 1-3 can comprise organic bases and/or strong metal containing bases. Example chemical bases can include, but are not limited to: 1,8-diazabicyclo[5.4.0]undec-7-ene ("DBU"), 7-methyl-1,5,7-triazabicyclo[4.4.0]dec-5-ene ("MTBD"), phosphazene bases, 1,3,2-diazaphosphorin-2-amin, 2-[(1,1-dimethylethyl)imino]-N,N-diethyl-1,2,2,2,3,4,5,6-octahydro-1,3-dimethyl ("BEMP"), 1,3-dihydro-1,3-bis(2,4,6-trimethylphenyl)imidazole-2-ylidene ("IMes"), potassium methoxide, potassium hydride, sodium methoxide, sodium hydride, a combination thereof, and/or the like. However, one of ordinary skill in the art will recognize that the one or more first anionic catalysts 110 can be derived through a variety of methodologies. As shown in the first polymerization scheme 108, "n" can be an integer, for example, that is greater than or equal to zero (e.g., 1 or 2), so as to include five-member rings as well as macrocyclic lactones. Additionally, "m" can be an integer ranging, for example, from greater than or equal to 1 and less than or equal to 1000.

As shown in FIG. 1, "X" can represent oxygen, sulfur, or nitrogen. Also, wherein "X" represents nitrogen, the nitrogen can be bonded to an additional functional group such as, but not limited to: an aryl group, an alkyl group, a combination thereof, and/or the like. Additionally, as shown in FIG. 1, "E" can represent oxygen or sulfur. Example first anionic catalysts 110 can include, but are not limited to: urethanes, thiourethanes, carbamates, thiocarbamates (e.g., S-thiocarbamates and/or O-thiocarbamates), dithiocarbamates, substituted variants thereof, derivatives thereof, combinations thereof, and/or the like. The one or more first anionic catalysts 110 can comprise one or more second groups (e.g., represented by "$R^2$" in FIGS. 1-3) and/or one or more third functional groups (e.g., represented by "$R^3$" in FIGS. 1-3). Example second and/or third functional groups can include, but are not limited to: alkyl groups, aryl groups, substituted aryl groups, trifluoromethyl groups, phenyl groups, a combination thereof, and/or the like.

The one or more flow reactors 100 can comprise, for example, one or more inlets 112, one or more channels 114, one or more reactor loops 116, and/or one or more outlets 118. The one or more channels 114 can extend from the one or more inlets 112 to the one or more outlets 118. The one or more channels 114 (e.g., microfluidic channels) can comprise, for example: tubes (e.g., microfluidic tubes), pipes, joiners (e.g., T-mixers), a combination thereof, and/or the like. Additionally, the one or more channels 114 can be oriented into one or more reactor loops 116 at one or more stages between the one or more inlets 112 and/or the one or more outlets 118. The one or more reactor loops 116 can influence the length of the one or more flow reactors 100 and thereby the residence time of the one or more ROPs within the one or more flow reactors 100. One of ordinary skill in the art will recognize that the number of loops comprising the reactor loops 116 and/or the dimensions of the loops can vary depending on a desired flow rate, residence time, and/or turbulence. Further, while the reactor loops 116 are depicted in FIGS. 1-3 as characterized by circular shaped structures, the architecture of the reactor loops 116 is not so limited. For example, the one or more reactor loops 116 can be characterized by elliptical and/or polygonal shaped structures.

The one or more ROPs depicted via the first polymerization scheme 108 can produce one or more polyesters 111. The one or more polyesters 111 can comprise a fourth functional group (e.g., represented by "$R^4$" in FIGS. 1-3) that can be derived from the one or more chemical bases. Example fourth functional groups can include, but are not limited to: alkyl groups, aryl groups, methyl groups, a combination thereof, and/or the like.

In the first polymerization scheme 108, the one or more lactone monomers 102 can enter the flow reactor 100 via one or more first inlets 112, while the one or more first anionic catalysts 110 and/or the one or more chemical bases can enter the flow reactor 100 via one or more second inlets 112. The one or more lactone monomers 102 can meet and/or mix with the one or more first anionic catalysts 110 and/or the one or more chemical bases within the one or more channels 114 of the flow reactor 100; thereby forming a stream of chemical reactants. As the stream flows through the flow reactor 100, one or more ROPs can be facilitated by the one or more first anionic catalysts 110, whereby the one or more lactone monomers 102 can be polymerized to form one or more polyesters 111 (e.g., a homopolymer solution of polyesters 111).

Furthermore, as shown in the second polymerization scheme 120 the one or more first anionic catalysts 110 can facilitate one or more ROPs of the one or more cyclic carbonate monomers 104 within one or more flow reactors 100 to produce one or more polycarbonates 122. The one or more cyclic carbonate monomers 104 can comprise one or more fifth functional groups (e.g., represented by "$R^5$" in FIGS. 1-3) and/or one or more sixth functional groups (e.g., represented by "$R^6$" in FIGS. 1-3). Example fourth and/or fifth functional groups can include, but are not limited to: alkyl groups, aryl groups, methyl groups, phenyl groups, amide groups, amine groups, ketone groups, ester groups, carboxyl groups, alcohol groups, alkane groups, alkene groups, alkyne groups, aldehyde groups, imine groups, thiol groups, thioester groups, ether groups, a combination thereof, and/or the like. One of ordinary skill in the art will recognize that the chemical structure for the one or more cyclic carbonate monomers 104 shown in FIGS. 1-3 is exemplary and the one or more cyclic carbonate monomers 104 can be characterized by a wide variety of chemical structures that comprise a carbonate group in a ring formation. As shown in the second polymerization scheme 120, "n" can be an integer ranging, for example, from greater than or equal to 1 and less than or equal to 1000. Further, the one or more polycarbonates 122 can also comprise the fourth functional group (e.g., represented by "$R^4$", which can be derived from the chemical base.

The third polymerization scheme 124 exemplifies that one or more second anionic catalysts 126 can also be utilized to polymerize the one or more lactone monomers 102 and produce the one or more polyesters 111. Similar to the one or more first anionic catalysts 110, the one or more second anionic catalysts 126 can comprise the one or more second functional groups (e.g., represented by "$R^2$" in FIGS. 1-3) and/or the one or more third functional groups (e.g., represented by "$R^3$" in FIGS. 1-3). In addition, the one or more second anionic catalysts 126 can comprise another functional group, such as the one or more seventh functional groups shown in FIG. 1 (e.g., represented by "$R^7$"). Example seventh functional groups can include, but are not limited to: alkyl groups, aryl groups, methyl groups, phenyl groups, amide groups, amine groups, ketone groups, ester groups, carboxyl groups, alcohol groups, alkane groups, alkene groups, alkyne groups, aldehyde groups, imine groups, thiol groups, thioester groups, ether groups, a combination thereof, and/or the like. As shown in FIG. 1, "L" can represent carbon and/or nitrogen. Further, the carbon and/or nitrogen atom represented by "L" can be bonded to an additional functional group such as, but not limited to: an aryl group, an alkyl group, a combination thereof, and/or the like.

In one or more embodiments, the one or more second anionic catalysts 126 can be derived from one or more chemical bases. However, one of ordinary skill in the art will recognize that the one or more second anionic catalysts 126 can be derived through a variety of methodologies. Further, the one or more second anionic catalysts 126 can also be activated in the presence of the one or more chemical bases. As shown in the third polymerization scheme 124, the one or more second anionic catalysts 126 can facilitate one or more ROPs of the one or more lactone monomers 102 within one or more flow reactors 100 to produce one or more polyesters 111 (e.g., a homopolymer solution of polyesters 111). Also, as shown in the third polymerization scheme 124, "n" can be an integer ranging, for example, that is greater than or equal to zero, so as to include five-member rings as well as macrocyclic lactones. Additionally, "m" can be an integer ranging, for example, from greater than or equal to 1 and less than or equal to 1000.

Moreover, the fourth polymerization scheme 128 can exemplify that one or more second anionic catalysts 126 can also be utilized to polymerize the one or more cyclic carbonate monomers 104 and produce the one or more polycarbonates 122. As shown in the fourth polymerization scheme 128, "n" can be an integer ranging, for example, from greater than or equal to 1 and less than or equal to 1000.

As shown in FIG. 2, the fifth polymerization scheme 202 exemplifies that one or more third anionic catalysts 204 can also be utilized to polymerize the one or more lactone monomers 102 and produce the one or more polyesters 111. Similar to the one or more first anionic catalysts 110, the one or more third anionic catalysts 204 can comprise the one or more second functional groups (e.g., represented by "$R^2$" in FIGS. 1-3) and/or the one or more third functional groups (e.g., represented by "$R^3$" in FIGS. 1-3). In addition, the one or more second anionic catalysts 126 can comprise the one or more seventh functional groups shown in FIG. 1 (e.g., represented by "$R^7$"). Example third anionic catalysts 204 can include, but are not limited to: guanidines, substituted guanidines, variants thereof, derivatives thereof, a combination thereof, and/or the like.

In one or more embodiments, the one or more third anionic catalysts 204 can be derived from one or more chemical bases. However, one of ordinary skill in the art will recognize that the one or more third anionic catalysts 204 can be derived through a variety of methodologies. Further, the one or more third anionic catalysts 204 can also be activated in the presence of the one or more chemical bases. As shown in the fifth polymerization scheme 202, the one or more third anionic catalysts 204 can facilitate one or more ROPs of the one or more lactone monomers 102 within one or more flow reactors 100 to produce one or more polyesters 111 (e.g., a homopolymer solution of polyesters 111). Also, as shown in the fifth polymerization scheme 202, "n" can be an integer ranging, for example, that is greater than or equal to zero, so as to include five-member rings as well as macrocyclic lactones. Additionally, "m" can be an integer ranging, for example, from greater than or equal to 1 and less than or equal to 1000.

Moreover, the sixth polymerization scheme 206 can exemplify that one or more third anionic catalysts 204 can also be utilized to polymerize the one or more cyclic carbonate monomers 104 and produce the one or more polycarbonates 122. As shown in the sixth polymerization scheme 206, "n" can be an integer ranging, for example, from greater than or equal to 1 and less than or equal to 1000.

Also shown in FIG. 2, the seventh polymerization scheme 208 exemplifies that one or more fourth anionic catalysts 210 can also be utilized to polymerize the one or more lactone monomers 102 and produce the one or more polyesters 111. Similar to the one or more first anionic catalysts 110, the one or more fourth anionic catalysts 210 can comprise the one or more second functional groups (e.g., represented by "$R^2$" in FIGS. 1-3) and/or the one or more third functional groups (e.g., represented by "$R^3$" in FIGS. 1-3). In addition, the one or more second anionic catalysts 126 can comprise the one or more seventh functional groups shown in FIG. 1 (e.g., represented by "$R^7$") and/or one or more eighth functional groups (e.g., represented by "$R^8$" in FIG. 2) that can include, but are not limited to: alkyl groups, aryl groups, combinations thereof, and/or the like. As shown in FIG. 2, "L" can represent carbon or nitrogen. Example fourth anionic catalysts 210 can include, but are not limited to: pyrroles (e.g., bipyrroles), imidazoles (e.g., biimidazoles), variants thereof, derivatives thereof, a combination thereof, and/or the like.

In one or more embodiments, the one or more fourth anionic catalysts 210 can be derived from one or more chemical bases. However, one of ordinary skill in the art will recognize that the one or more fourth anionic catalysts 210 can be derived through a variety of methodologies. Further, the one or more fourth anionic catalysts 210 can also be activated in the presence of the one or more chemical bases. As shown in the seventh polymerization scheme 208, the one or more fourth anionic catalysts 210 can facilitate one or more ROPs of the one or more lactone monomers 102 within one or more flow reactors 100 to produce one or more polyesters 111 (e.g., a homopolymer solution of polyesters 111). Also, as shown in the seventh polymerization scheme 208, "n" can be an integer ranging, for example, that is greater than or equal to zero, so as to include five-member rings as well as macrocyclic lactones. Additionally, "m" can be an integer ranging, for example, from greater than or equal to 1 and less than or equal to 1000.

Moreover, the eighth polymerization scheme 212 can exemplify that one or more fourth anionic catalysts 210 can also be utilized to polymerize the one or more cyclic carbonate monomers 104 and produce the one or more polycarbonates 122. As shown in the eighth polymerization scheme 212, "n" can be an integer ranging, for example, from greater than or equal to 1 and less than or equal to 1000.

As shown in FIG. 3, the ninth polymerization scheme 302 exemplifies that one or more fifth anionic catalysts 304 can also be utilized to polymerize the one or more lactone monomers 102 and produce the one or more polyesters 111. Similar to the one or more first anionic catalysts 110, the one or more fifth anionic catalysts 304 can comprise the one or more second functional groups (e.g., represented by "$R^2$" in FIGS. 1-3) and/or the one or more third functional groups (e.g., represented by "$R^3$" in FIGS. 1-3). Example fifth anionic catalysts 304 can include, but are not limited to: squaramides, variants thereof, derivatives thereof, a combination thereof, and/or the like.

In one or more embodiments, the one or more fifth anionic catalysts 304 can be derived from one or more chemical bases. However, one of ordinary skill in the art will recognize that the one or more fifth anionic catalysts 304 can be derived through a variety of methodologies. Further, the one or more fifth anionic catalysts 304 can also be activated in the presence of the one or more chemical bases. As shown in the ninth polymerization scheme 302, the one or more fifth anionic catalysts 304 can facilitate one or more ROPs of the one or more lactone monomers 102 within one or more flow reactors 100 to produce one or more polyesters 111 (e.g., a homopolymer solution of polyesters 111). Also, as shown in the ninth polymerization scheme 302, "n" can be an integer ranging, for example, that is greater than or equal to zero, so as to include five-member rings as well as macrocyclic lactones. Additionally, "m" can be an integer ranging, for example, from greater than or equal to 1 and less than or equal to 1000.

Moreover, the tenth polymerization scheme 306 can exemplify that one or more fifth anionic catalysts 304 can also be utilized to polymerize the one or more cyclic carbonate monomers 104 and produce the one or more polycarbonates 122. As shown in the tenth polymerization scheme 306, "n" can be an integer ranging, for example, from greater than or equal to 1 and less than or equal to 1000.

Further, while FIGS. 1-3 depicts the use of lactone monomers 102 and/or cyclic carbonate monomers 104 in ROPs with one or more anionic catalysts in one or more flow reactors 100 to produce one or more polyesters 111 and/or polycarbonates 122, the architecture of the ROPs is not so limited. For example, the one or more anionic catalysts, and/or one or more flow reactors 100 can be utilized with various other types of cyclic monomers to produce one or more polymers (e.g., polyesters 111 and/or polycarbonates 122). Example cyclic monomers that can be utilized to practice the one or more embodiments described herein can include, but are not limited to: lactone monomers 102, cyclic carbonate monomers 104, substituted cyclic carbonates, cyclic phospholane monomers, morpholinone monomers, tetrahydro-2H-pyran-2-thione, oxepane-2-thione, tetrahydrothiopyranone, 2-thiepanone, derivatives thereof, combinations thereof, and/or the like.

In one or more embodiments, the polymerization schemes depicted in FIGS. 1-3 can be performed via a continuous flow of chemical reactants through the one or more flow reactors 100. Also, for each of the polymerization schemes depicted in FIGS. 1-3, polymerization conditions (e.g., residence time within the flow reactor 100, molecular weight distribution of one or more polymers, transesterification of the one or more polymers' molecular backbone, reaction rate of the one or more ROPs, a combination thereof, and/or like) can be dependent on one or more parameters of the flow reactor 100. Example parameters that can influence polymerization conditions can include, but are not limited to: length of the one or more channels 114, number of reactor loops 116, dimensions of the reactor loops 116, flow rate of the stream of chemical reactants, structure of a chemical mixer, a combination thereof, and/or like. For instance, a degree of mixing between the chemical reactants in the stream housed by the flow reactor 100 (e.g., via the one or more channels 114) can directly influence the molecular weight distribution of the products (e.g., the one or more polyesters 111 and/or the one or more polycarbonates 122). The degree of mixing can be function of turbulence generated within the stream as it flows through the flow reactor 100 and can be influenced by parameters such as internal structure of the one or more channels 114 and/or the flow rate of the stream.

Figure 4:
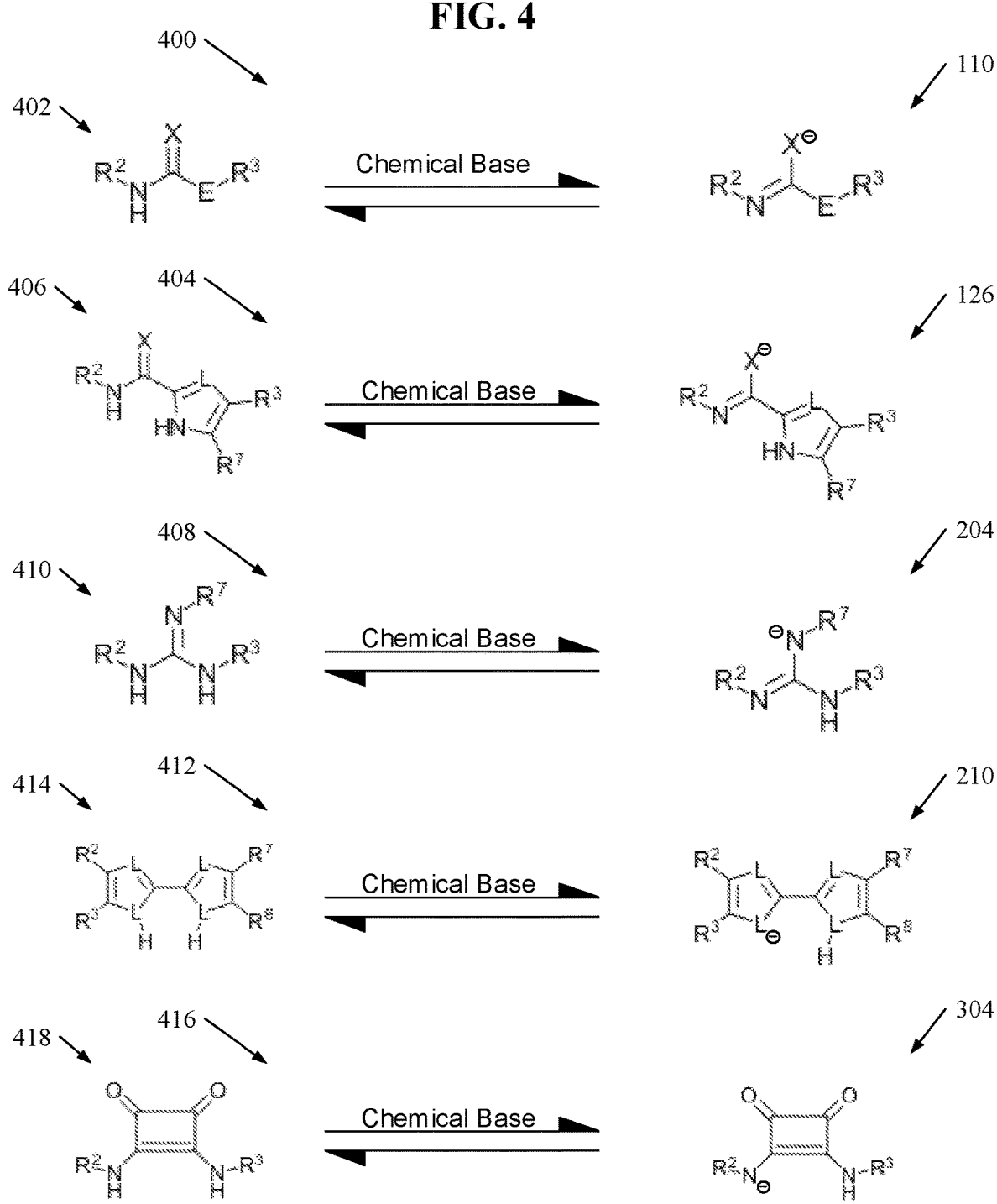
FIG. 4 illustrates a diagram of example, non-limiting deprotonation schemes that can form one or more anionic catalysts, which can facilitate one or more ring-opening polymerizations within one or more flow reactors in accordance with one or more embodiments described herein.

FIG. 4 illustrates a diagram of example, non-limiting deprotonation schemes that can facilitate activation and/or formation of the one or more anionic catalysts in accordance with one or more embodiments described herein. Repetitive description of like elements employed in other embodiments described herein is omitted for sake of brevity. The deprotonations depicted via the deprotonation schemes of FIG. 4 can be performed at room temperature. Further, the deprotonations depicted via the deprotonation schemes of FIG. 4 can be performed inside and/or outside the one or more channels 114 of the one or more flow reactors 100. The deprotonation schemes depicted in FIG. 4 can be quantitative, relative to the chemical base, deprotonations by the chemical base (e.g., wherein the chemical base is a strong metal-containing base, such as potassium methoxide) or can be partial deprotonations by the chemical base (e.g., wherein the chemical base is an organic base, such as DBU).

As shown in FIG. 4, the first deprotonation scheme 400 can facilitate activation and/or formation of the one or more first anionic catalysts 110. In the first deprotonation scheme 400, one or more first chemical compounds 402 can be subject to deprotonation to form the one or more first anionic catalysts 110. The one or more first chemical compounds 402 can be electrically neural (e.g., non-ionic). Further, the one or more first chemical compounds 402 can comprise one or more nitrogen-hydrogen bonds, one or more second functional groups (e.g., represented by "$R^2$"), and/or the one or more third functional groups (e.g., represented by "$R^3$"). Example first chemical compounds 402 from which the one or more first anionic catalysts 110 can be derived, in accordance with the first deprotonation scheme 400, can include, but are not limited to: urethanes, thiourethanes, carbamates, thiocarbamates (e.g., S-thiocarbamates and/or O-thiocarbamates), dithiocarbamates, substituted variants thereof, derivatives thereof, combinations thereof, and/or the like The second deprotonation scheme 404 can facilitate activation and/or formation of the one or more second anionic catalysts 126. In the second deprotonation scheme 404, one or more second chemical compounds 406 can be subject to deprotonation to form the one or more second anionic catalysts 126. The one or more second chemical compounds 406 can be electrically neural (e.g., non-ionic). Further, the one or more second chemical compounds 406 can comprise one or more nitrogen-hydrogen bonds, one or more second functional groups (e.g., represented by "$R^2$" again), one or more third functional groups (e.g., represented by "$R^3$" again), and/or one or more seventh functional groups (e.g., represented by "$R^7$"). In one or more embodiments, the second deprotonation scheme 404 can comprise two deprotonations (e.g., the deprotonation of two nitrogen-hydrogen bonds) to render two anions (e.g., as shown in FIG. 4).

In one or more embodiments, the second deprotonation scheme 404 can comprise one deprotonation (e.g., the deprotonation of one of two nitrogen-hydrogen bonds) to render one anions.

The third deprotonation scheme 408 can facilitate activation and/or formation of the one or more third anionic catalysts 204. In the third deprotonation scheme 408, one or more third chemical compounds 410 can be subject to deprotonation to form the one or more third anionic catalysts 204. The one or more third chemical compounds 410 can be electrically neural (e.g., non-ionic). Further, the one or more third chemical compounds 410 can comprise one or more nitrogen-hydrogen bonds, one or more second functional groups (e.g., represented by "$R^2$" again), one or more third functional groups (e.g., represented by "$R^3$" again), and/or one or more seventh functional groups (e.g., represented by "$R^7$"). Example third chemical compounds 410 from which the one or more third anionic catalysts 204 can be derived, in accordance with the third deprotonation scheme 408, can include, but are not limited to: guanidines, variants thereof, combinations thereof, and/or the like.

The fourth deprotonation scheme 412 can facilitate activation and/or formation of the one or more fourth anionic catalysts 210. In the fourth deprotonation scheme 412, one or more fourth chemical compounds 414 can be subject to deprotonation to form the one or more fourth anionic catalysts 210. The one or more fourth chemical compounds 414 can be electrically neural (e.g., non-ionic). Further, the one or more fourth chemical compounds 414 can comprise one or more nitrogen-hydrogen bonds, one or more second functional groups (e.g., represented by "$R^2$" again), one or more third functional groups (e.g., represented by "$R^3$" again), one or more seventh functional groups (e.g., represented by "$R^7$"), and/or one or more eighth functional groups (e.g., represented by "$R^8$"). In one or more embodiments, the fourth deprotonation scheme 414 can comprise two deprotonations (e.g., the deprotonation of two nitrogen-hydrogen bonds) to render two anions (e.g., as shown in FIG. 4). In one or more embodiments, the fourth deprotonation scheme 414 can comprise one deprotonation (e.g., the deprotonation of one of two nitrogen-hydrogen bonds) to render one anions. Example fourth chemical compounds 414 from which the one or more fourth anionic catalysts 210 can be derived, in accordance with the fourth deprotonation scheme 412, can include, but are not limited to: pyrroles (e.g., bipyrroles), imidazoles (e.g., biimidazoles), variants thereof, derivatives thereof, a combination thereof, and/or the like. For instance, chemical structure 1 and/or chemical structure 2, shown below, can characterize the fourth chemical compound 414.

Chemical Structure 1

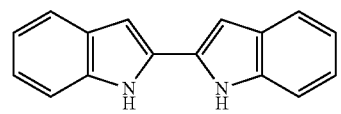

Chemical Structure 2

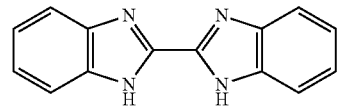

The fifth deprotonation scheme 416 can facilitate activation and/or formation of the one or more fifth anionic catalysts 304. In the fifth deprotonation scheme 416, one or more fifth chemical compounds 416 can be subject to deprotonation to form the one or more fifth anionic catalysts 304. The one or more fifth chemical compounds 418 can be electrically neural (e.g., non-ionic). Further, the one or more fifth chemical compounds 418 can comprise one or more nitrogen-hydrogen bonds, one or more second functional groups (e.g., represented by "R²" again), and/or one or more third functional groups (e.g., represented by "R³" again). In one or more embodiments, the fifth deprotonation scheme 416 can comprise one deprotonation (e.g., the deprotonation of one of two nitrogen-hydrogen bonds) to render one anions. Example fifth chemical compounds 418 from which the one or more fifth anionic catalysts 304 can be derived, in accordance with the fifth deprotonation scheme 416, can include, but are not limited to: squaramides, and/or the like. For instance, chemical structure 3, shown below, can characterize the fifth chemical compound 418.

Chemical Structure 3

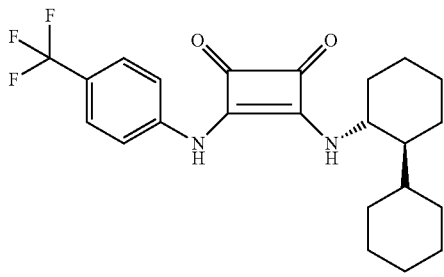

Figure 5A:
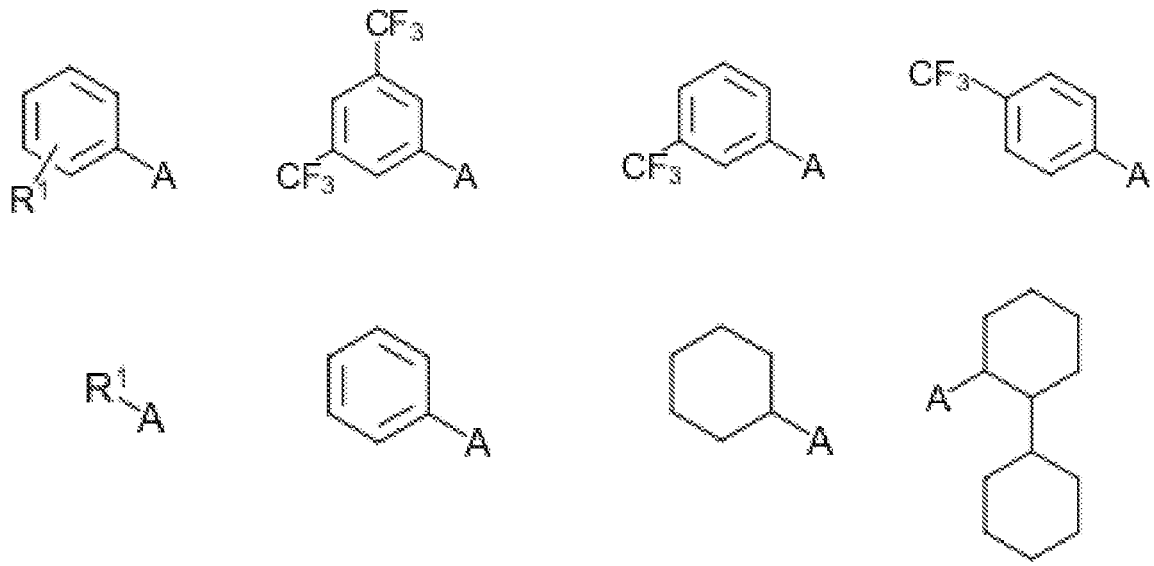
FIG. 5A illustrates a diagram of example, non-limiting functional groups that can be comprised within one or more anionic catalysts, which can facilitate one or more ring-opening polymerizations within one or more flow reactors in accordance with one or more embodiments described herein.

FIG. 5A illustrates a diagram of example, non-limiting functional groups that can characterize the structure of the one or more second functional groups (e.g., represented by "R²"), the one or more third functional groups (e.g., represented by "R³"), the one or more seventh functional groups (e.g., represented by "R⁷"), and/or the one or more eighth functional groups (e.g., represented by "R⁸") in accordance with one or more embodiments described herein. Repetitive description of like elements employed in other embodiments described herein is omitted for sake of brevity. For example, as shown in FIG. 5A, "A" can represent the molecular backbone of a chemical compound (e.g., first chemical compound 402, second chemical compound 406, third chemical compound 410, fourth chemical compound 414, and/or fifth chemical compound 418) from which an anionic catalyst (e.g., first anionic catalyst 110, second anionic catalyst 126, third anionic catalyst 204, fourth anionic catalyst 210, and/or fifth anionic catalyst 304) can be derived and/or can represent the molecular backbone of the anionic catalyst itself.

Figure 5B:
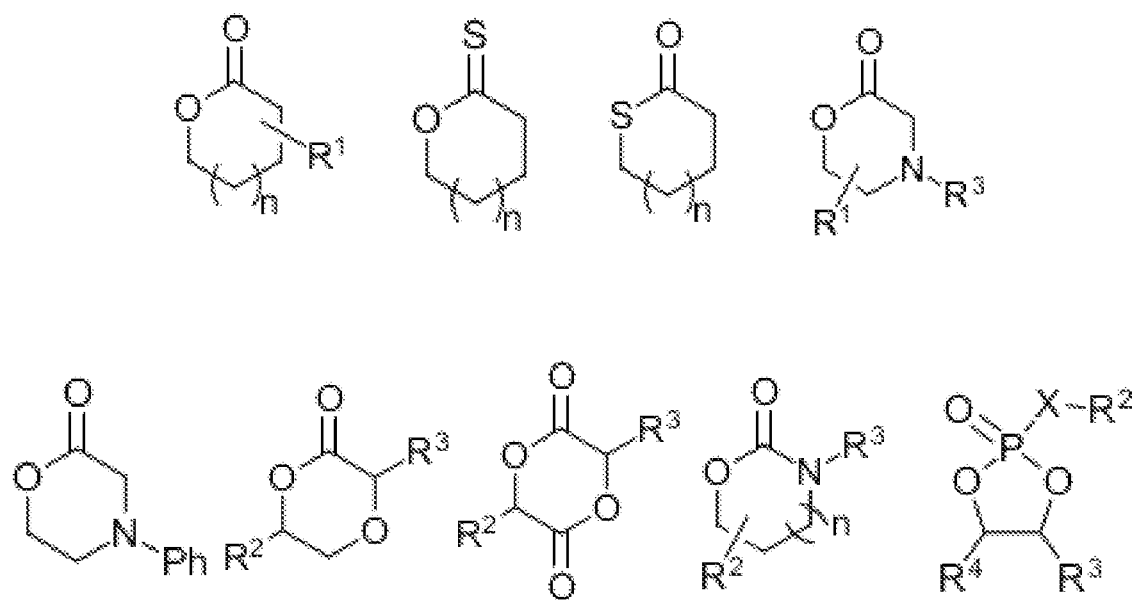
FIG. 5B illustrates a diagram of example, non-limiting cyclic monomers that can be polymerized with one or more anionic catalysts to facilitate one or more ring-opening polymerizations within one or more flow reactors in accordance with one or more embodiments described herein.

FIG. 5B illustrates a diagram of example, non-limiting cyclic monomers that can be polymerized with one or more anionic catalysts described herein to facilitate one or more ROPs within one or more flow reactors 100 in accordance with one or more embodiments described herein. Repetitive description of like elements employed in other embodiments described herein is omitted for sake of brevity. FIG. 5B depicts exemplary cyclic monomers, in addition to the one or more lactone monomers 102 and/or cyclic carbonate monomers 104, that can undergo ROPs within one or more flow reactors 100 to synthesize one or more polymers through the use of the one or more anionic catalysts in accordance with the various embodiments described herein. As shown in FIG. 5B, "n" can be an integer that is greater than or equal to one (e.g., 1 or 2). In one or more embodiments, the cyclic monomers can have five-member rings.

For instance, the one or more cyclic monomers can include, but are not limited to: lactone monomers 102, cyclic carbonate monomers 104, substituted cyclic carbonates, cyclic phospholane monomers, morpholinone monomers, tetrahydro-2H-pyran-2-thione, oxepane-2-thione, tetrahydrothiopyranone, 2-thiepanone, derivatives thereof, combinations thereof, and/or the like. One of ordinary skill in the art will recognize that the chemical structure for the one or more cyclic monomers shown in FIG. 5B is exemplary and the one or more cyclic monomers can be characterized by a wide variety of chemical structures.

In one or more embodiments, the one or more features of the ROPs depicted in FIGS. 1-5A (e.g., ROP comprising an anionic catalyst within one or more flow reactors 100) can be utilized with the various cyclic monomers depicted in FIG. 5B to produce a variety of polymers (e.g., homopolymers and/or copolymers). For example, the ROPs described in the various embodiments herein can produce polythioesters, polyamides, and/or polyphosphoesters in addition to the polyesters 111 and/or polycarbonates 122. Additionally, these polythioesters, polyamides, and/or polyphosphoesters chemical products can comprise the fourth functional group (e.g., "R⁴") described herein. For instance, one of ordinary skill in the art will recognize that the various cyclic monomers described herein (e.g., depicted in FIG. 5B) can polymerize (e.g., in the presence of one or more anionic catalysts described herein), within the one or more flow reactors 100, along a carbonyl oxygen and/or carbonyl-thiol bond that breaks during the ROP, thereby producing a growing oxygen-hydrogen ("OH") or sulfur-hydrogen ("SH") structure.

Figure 6:
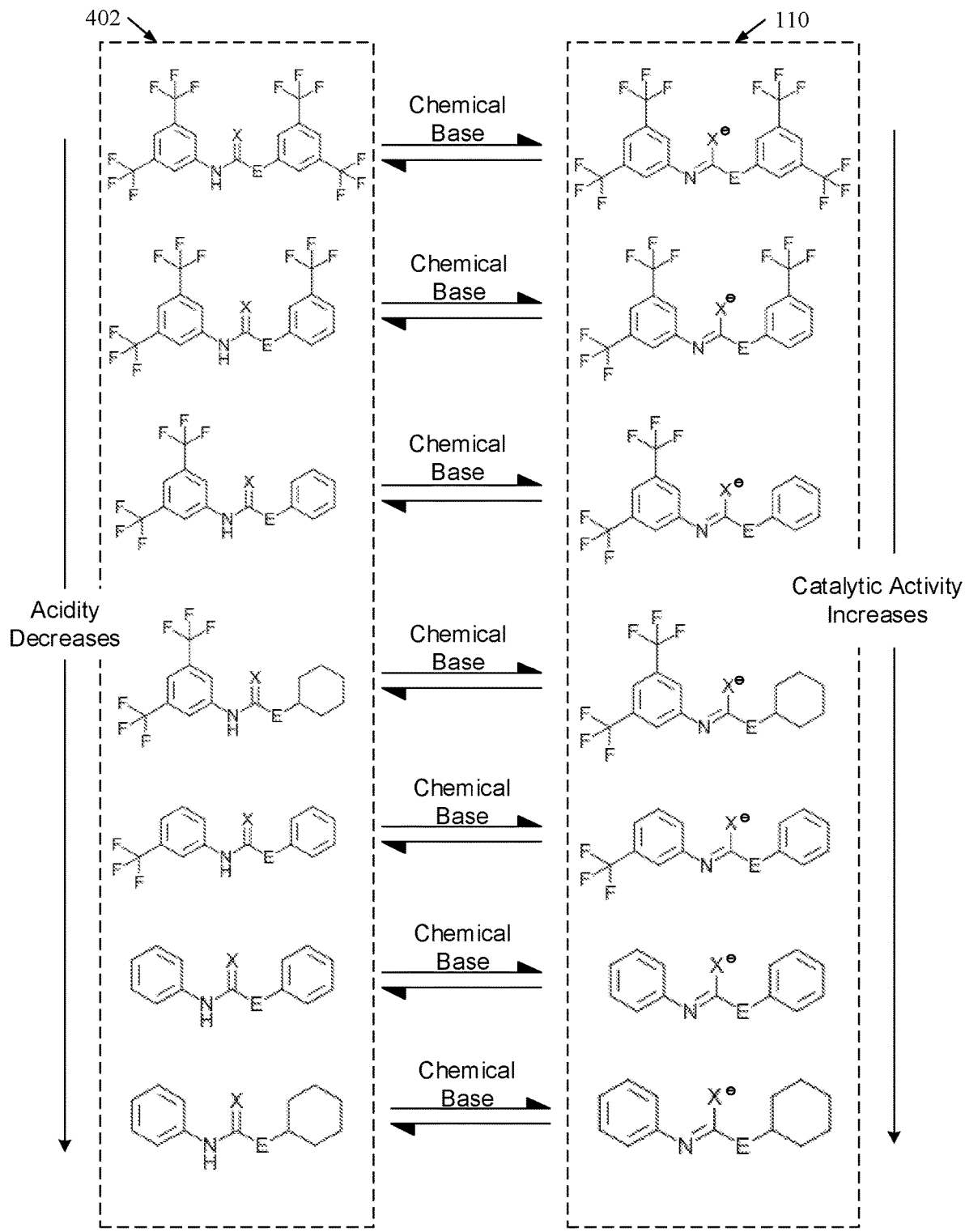
FIG. 6 illustrates a diagram of example, non-limiting deprotonation reactions that can form one or more anionic catalysts, which can facilitate one or more ring-opening polymerizations within one or more flow reactors in accordance with one or more embodiments described herein.

FIG. 6 illustrates a diagram of example, non-limiting deprotonation reactions that can facilitate activation and/or formation of the one or more first anionic catalysts 110 in accordance with one or more embodiments described herein. Repetitive description of like elements employed in other embodiments described herein is omitted for sake of brevity. For example, the deprotonations depicted in FIG. 6 can exemplify the features depicted and/or described with regards to FIGS. 4-5B.

As indicated by an arrow flanking the left side of FIG. 6, the example first chemical compounds 402 are presented in order by decreasing acidity from the top of FIG. 6 to the bottom of FIG. 6. As indicated by an arrow flanking the right side of FIG. 6, the exemplary first anionic catalysts 110 are presented in order by increasing catalytic activity (e.g., with regards to at least the ROPs characterized by the first polymerization scheme 108 and/or the second polymerization scheme 120) from the top of FIG. 6 to the bottom of FIG. 6. Thus, as illustrated in FIG. 6, as acidity of the one or more first chemical compounds 402 decreases, the catalytic activity of the corresponding first anionic catalysts 110 increases.

Amongst the plurality of first anionic catalysts 110 presented in FIG. 6, a difference between the catalytic activity of the most reactive first anionic catalyst 110 and the least reactive first anionic catalysts 110 can reach up to ten orders of magnitude. Thus, the one or more polymerization schemes described herein (e.g., first polymerization scheme 108 and/or second polymerization scheme 120) can use one or more first anionic catalysts 110 based on the cyclic monomer being polymerized. For example, the selection of a first anionic catalysts 110 to be utilized in a subject ROP can be catered to cyclic monomers of different reactivity and/or stability. Therefore, one or more polymerization conditions (e.g., conversion rate and/or molecular weight dispersity) can be adjusted by varying the first anionic catalysts 110 identity and/or concentration without changing one or more parameters of the flow reactor 100.

One of ordinary skill in the art will recognize that the plurality of first anionic catalysts 110 depicted in FIG. 6 are exemplary, and a variety of additional anionic catalysts can be utilized in accordance with the various embodiments described herein. For example, just as a plurality of first anionic catalysts 110 having varying catalytic activity are shown in FIG. 6, one or more embodiments can also comprise a plurality of second anionic catalysts 126, third anionic catalysts 204, fourth anionic catalysts 210, and/or fifth anionic catalysts 304; wherein each respective plurality of anionic catalysts can have varying catalytic activity. Additionally, a multitude of first anionic catalysts 110 having a different chemical structure than that depicted in FIG. 6 can be derived and/or utilized in accordance with the various embodiments described herein. FIG. 6 exemplifies that amongst the anionic catalysts described herein, catalytic activity can increase as acidity of the subject anionic catalyst and/or chemical compound from which it derives increases.

Figure 7:
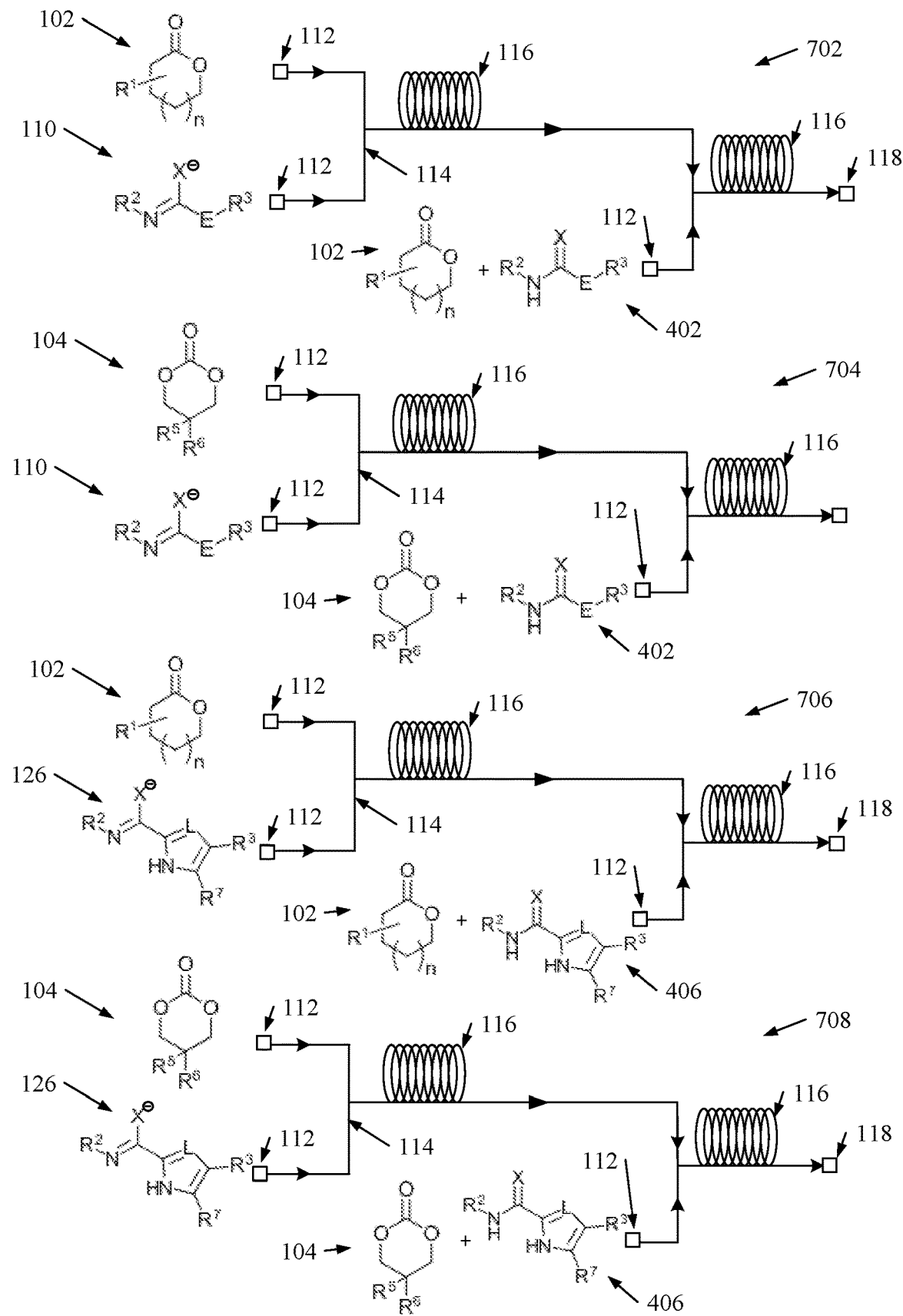
FIG. 7 illustrates a diagram of example, non-limiting polymerization schemes that can facilitate forming one or more block copolymers via one or more ring-opening polymerizations within one or more flow reactors in accordance with one or more embodiments described herein.
Figure 8:
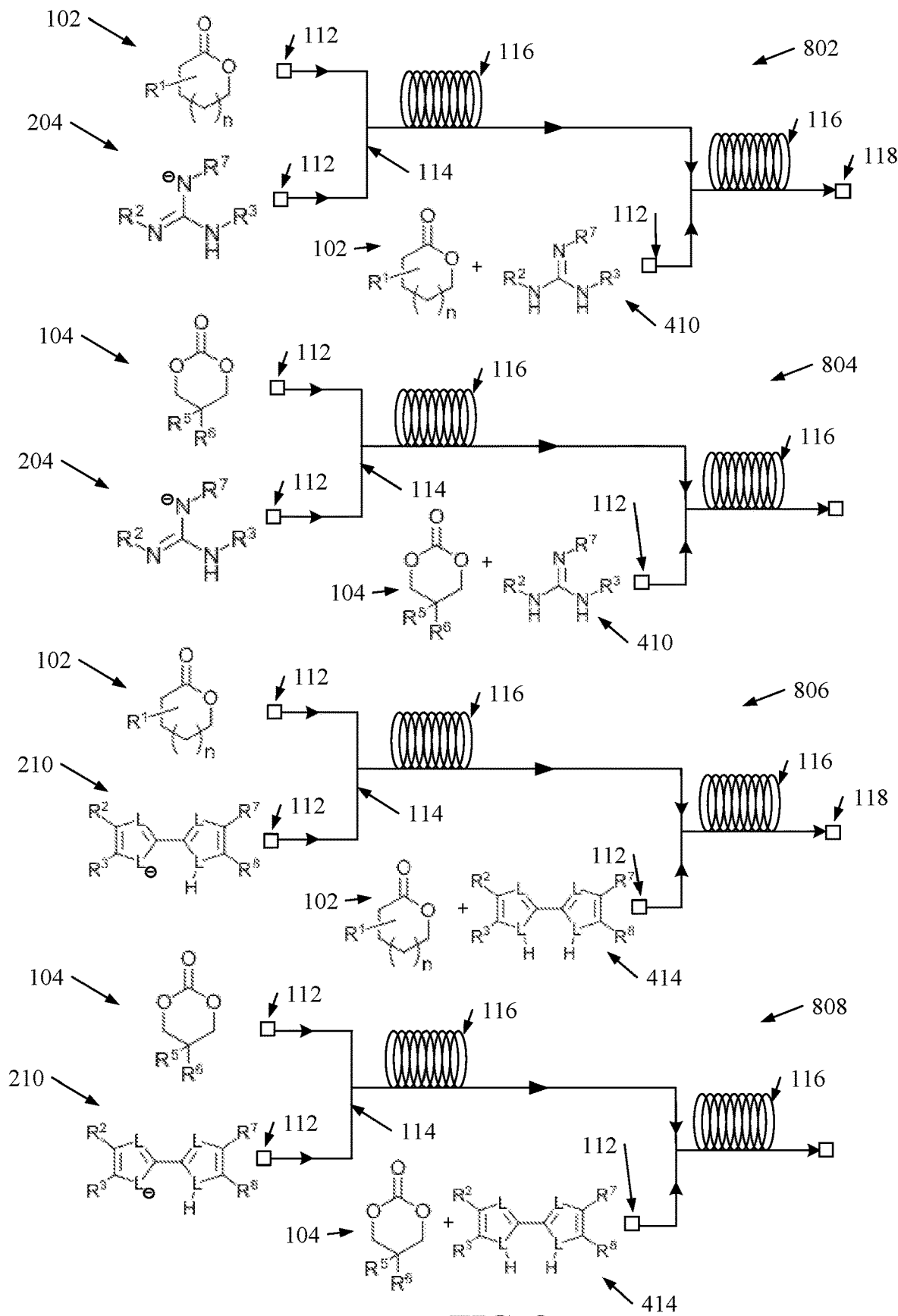
FIG. 8 illustrates a diagram of example, non-limiting polymerization schemes that can facilitate forming one or more block copolymers via one or more ring-opening polymerizations within one or more flow reactors in accordance with one or more embodiments described herein.
Figure 9:
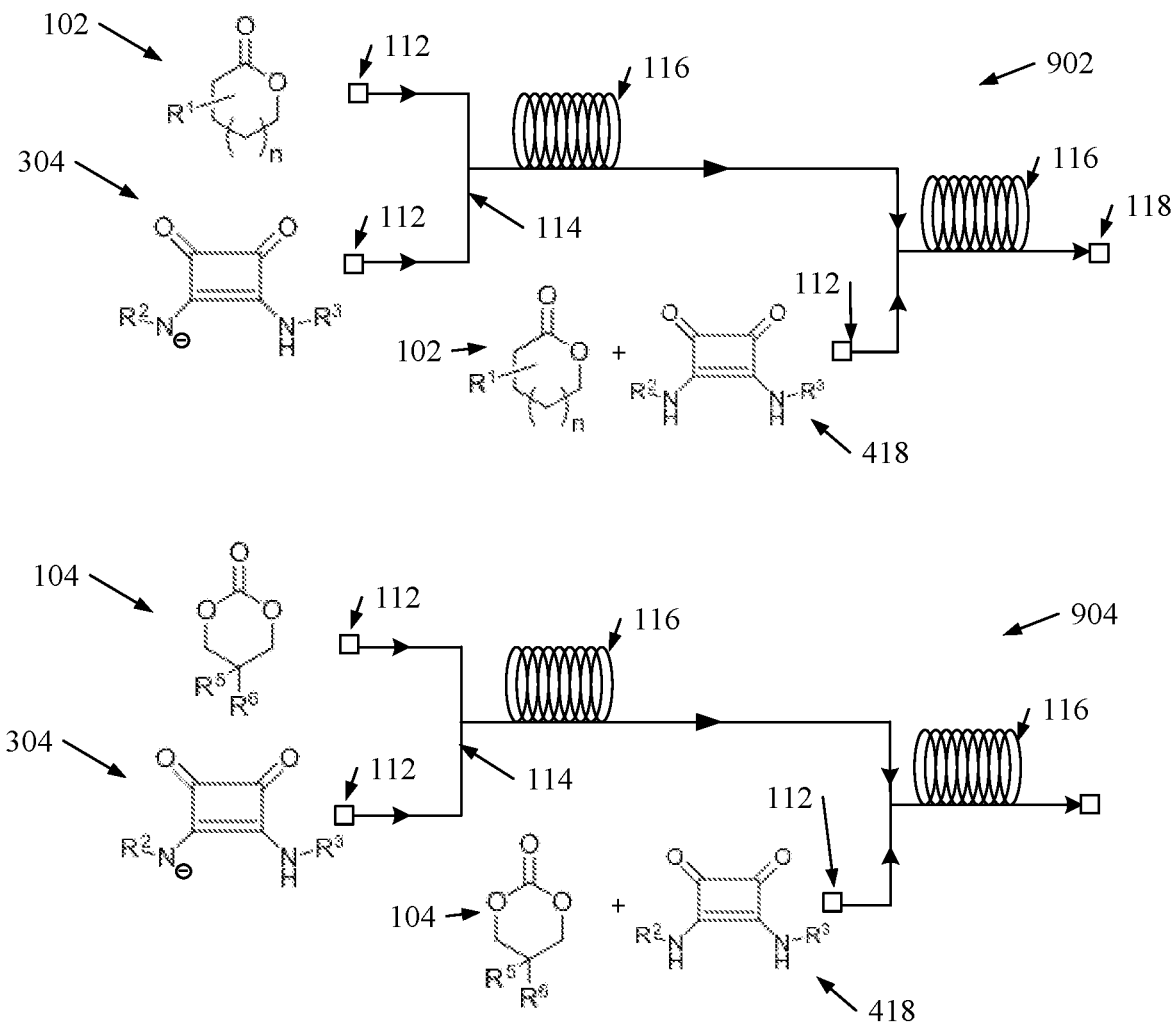
FIG. 9 illustrates a diagram of example, non-limiting polymerization schemes that can facilitate forming one or more block copolymers via one or more ring-opening polymerizations within one or more flow reactors in accordance with one or more embodiments described herein.

FIGS. 7-9 illustrate diagrams of example, non-limiting polymerization schemes that can facilitate synthesis of one or more copolymers (e.g., block copolymers) via one or more ROP conducted within one or more flow reactors 100 in accordance with one or more embodiments described herein. Repetitive description of like elements employed in other embodiments described herein is omitted for sake of brevity. The polymerizations depicted in FIGS. 7-9 comprise many of the same features described with regards to FIGS. 1-3, but with an additional step to facilitate the synthesis of block copolymers. The matching of cyclic monomer and catalyst reactivity enables a catalyst switch approach for block copolymer synthesis using cyclic monomers with disparate reactivity profiles. For example, an active first anionic catalyst 110 for polymerization of the first block can be quenched by the addition of a neutral first chemical compound 402 via a proton transfer to generate a new first anionic catalyst 110 with a different catalytic activity for the polymerization of the second block. In another example, an active second anionic catalysts 126, third anionic catalysts 204, fourth anionic catalysts 210, and/or fifth anionic catalysts 304 for polymerization of the first block can be quenched by the addition of a neutral second chemical compound 406, third chemical compound 410, fourth chemical compound 414, and/or fifth chemical compound 418 via a proton transfer to generate a new second anionic catalysts 126, third anionic catalysts 204, fourth anionic catalysts 210, and/or fifth anionic catalysts 304 with a different catalytic activity for the polymerization of the second block.

The syntheses of well-defined block copolymers can be important for many material applications, including the generation of nanoparticles and functional bioactive polymers. Under traditional batch polymerization conditions, the synthesis of block copolymers with narrow molecular weight distributions can be challenging. The polymerization, isolation, and purification of the block copolymer intermediates can be tedious and time consuming for multi-step synthetic processes. Whereas synthesizing block copolymers in one container relies on the efficient addition and mixing of monomers for each sequential block. The utilization of flow reactors 100 (e.g., via continuous flow polymerization) offers an excellent alternative to traditional batch procedures for the preparation multi-block polymers as the monomers for each block can be seamlessly introduced in sequential stages of one or more flow reactors 100 with highly efficient mixing.

One of ordinary skill in the art will recognize that the chemical structure for the one or more lactone monomers 102 shown in FIGS. 7-9 is exemplary and the one or more lactone monomers 102 can be characterized by a wide variety of chemical structures that comprise an ester group as part of a ring formation. Additionally, one of ordinary skill in the art will recognize that the chemical structure for the one or more cyclic carbonate monomers 104 shown in FIGS. 7-9 is exemplary and the one or more cyclic carbonate monomers 104 can be characterized by a wide variety of chemical structures that comprise a carbonate group in a ring formation. In each of the polymerization schemes shown in FIGS. 7-9, "n" can respectively be an integer ranging, for example, that is greater than or equal to zero (e.g., 1 or 2), so as to include five-member rings as well as macrocyclic lactones.

As shown in FIG. 7, with regards to the eleventh polymerization scheme 702, ROP of the one or more lactone monomers 102 and the one or more first anionic catalysts 110 can produce an intermediate polymer that can serve as the first block of a multiblock copolymer. The intermediate polymer can be further polymerized by the introduction of an additional lactone monomer 102. For example, the additional lactone monomer 102 can enter the flow reactor 100 via a third inlet 112 and can mix with a stream of the intermediate polymer in the one or more channels 114 of the flow reactor 100.

Additionally, in one or more embodiments, one or more first chemical compounds 402 can enter the flow reactor 100 (e.g., via the third inlet 112) to facilitate a switch of the active first anionic catalyst 110. For example, the first chemical compound 402 can mix in the one or more channels 114 with the first anionic catalyst 110 used to synthesize the intermediate polymer; thereby initiating a proton transfer that can neutralize the first anionic catalyst 110 and ionize the first chemical compound 402. In effect, introducing the additional first chemical compound 402 to the stream comprising the intermediate polymer can transform the first anionic catalyst 110 to a first chemical compound 402 and the additional first chemical compound 402 to a first anionic catalyst 110; thereby switching the active catalyst from one exemplary first anionic catalyst 110 to another. Similarly, the twelfth polymerization scheme 704 can exemplify the catalyst switch techniques with regards to cyclic carbonate monomers 104.

The thirteenth polymerization scheme 706, which can be a modification to the third polymerization scheme 124, can exemplify the catalyst switch using a second anionic catalyst 126. For example, a second anionic catalyst 126 can facilitate a first ROP of a first lactone monomer 102, which can serve as a first block of a copolymer, and then can be protonated by a second chemical compound 406 in another stage of the flow reactor 100. The protonation can quench the active second anionic catalyst 126 and simultaneously form a new second anionic catalyst 126 from the second chemical compound 406, wherein the newly active second anionic catalyst 126 can facilitate a second ROP of a second lactone monomer 102 that can serve as a second block of the copolymer. Similarly, the fourteenth polymerization scheme 708 can exemplify the catalyst switch techniques with regards to cyclic carbonate monomers 104.

As shown in FIG. 8, the fifteenth polymerization scheme 802, which can be a modification to the fifth polymerization scheme 202, can exemplify the catalyst switch using a third anionic catalyst 204. For example, a third anionic catalyst 204 can facilitate a first ROP of a first lactone monomer 102, which can serve as a first block of a copolymer, and then can be protonated by a third chemical compound 410 in another stage of the flow reactor 100. The protonation can quench the active third anionic catalyst 204 and simultaneously form a new third anionic catalyst 204 from the third chemical compound 410, wherein the newly active third anionic catalyst 204 can facilitate a second ROP of a second lactone monomer 102 that can serve as a second block of the copolymer. Similarly, the sixteenth polymerization scheme 804 can exemplify the catalyst switch techniques with regards to cyclic carbonate monomers 104.

The seventeenth polymerization scheme 806, which can be a modification to the seventh polymerization scheme 208, can exemplify the catalyst switch using a fourth anionic catalyst 210. For example, a fourth anionic catalyst 210 can facilitate a first ROP of a first lactone monomer 102, which can serve as a first block of a copolymer, and then can be protonated by a fourth chemical compound 414 in another stage of the flow reactor 100. The protonation can quench the active fourth anionic catalyst 210 and simultaneously form a new fourth anionic catalyst 210 from the fourth chemical compound 414, wherein the newly active fourth anionic catalyst 210 can facilitate a second ROP of a second lactone monomer 102 that can serve as a second block of the copolymer. Similarly, the eighteenth polymerization scheme 808 can exemplify the catalyst switch techniques with regards to cyclic carbonate monomers 104.

As shown in FIG. 9, the nineteenth polymerization scheme 902, which can be a modification to the ninth polymerization scheme 302, can exemplify the catalyst switch using a fifth anionic catalyst 304. For example, a fifth anionic catalyst 304 can facilitate a first ROP of a first lactone monomer 102, which can serve as a first block of a copolymer, and then can be protonated by a fifth chemical compound 418 in another stage of the flow reactor 100. The protonation can quench the active fifth anionic catalyst 304 and simultaneously form a new fifth anionic catalyst 304 from the fifth chemical compound 418, wherein the newly active fifth anionic catalyst 304 can facilitate a second ROP of a second lactone monomer 102 that can serve as a second block of the copolymer. Similarly, the twentieth polymerization scheme 904 can exemplify the catalyst switch techniques with regards to cyclic carbonate monomers 104

Each of the exemplary polymerization schemes shown in FIGS. 7-9 comprise ROP of respective cyclic monomers, wherein each respective cyclic monomer in a given polymerization scheme can be characterized by a different chemical structure. Additionally, wherein a polymerization scheme can include a catalyst switch (e.g., as depicted in the polymerization schemes of FIGS. 7-9), the initial anionic organocatalyst can be derived from a chemical compound that is different than the chemical compound introduced into the flow reactor 100 to facilitate the catalyst switch. In one or more embodiments, the polymerization schemes depicted in FIGS. 7-9 can be performed via a continuous flow of chemical reactants through the one or more flow reactors 100.

In one or more embodiments, the one or more of the polymerization schemes depicted in FIGS. 7-9 can include a ROP of a first cyclic monomer (e.g., a lactone monomer 102) to form one block of a copolymer and/or another ROP of a second cyclic monomer (e.g., a cyclic carbonate monomer 104) to form another block of the copolymer. Also, in one or more embodiments, one type of anionic catalyst (e.g., a first anionic catalyst 110) can be protonated by a chemical compound; thereby facilitating a catalyst switch from the one type of anionic catalyst (e.g., the first anionic catalyst 110) to another type of anionic catalyst (e.g., a second anionic catalyst 126).

Figure 10A:
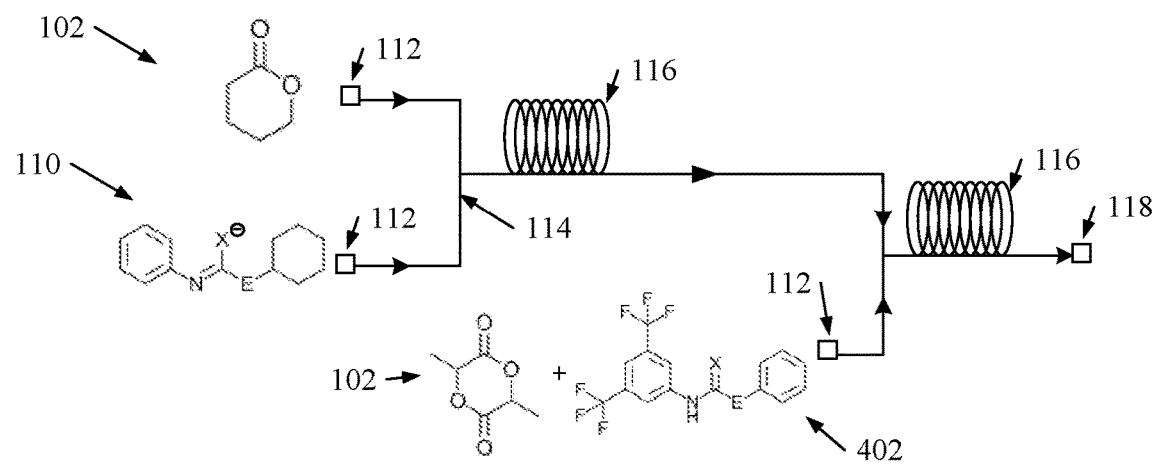
FIG. 10A illustrates a diagram of an example, non-limiting polymerization that can facilitate forming one or more block copolymers via one or more ring-opening polymerizations within one or more flow reactors in accordance with one or more embodiments described herein.

FIG. 10A illustrates a diagram of an example, non-limiting polymerization that can be performed in accordance with the eleventh polymerization scheme 702 and/or in accordance with one or more embodiments described herein. Repetitive description of like elements employed in other embodiments described herein is omitted for sake of brevity. In one or more embodiments, the polymerization of FIG. 10A can be performed at room temperature and/or in a continuous flow of the chemical reactants in a stream through the one or more flow reactors 100.

Figure 10B:
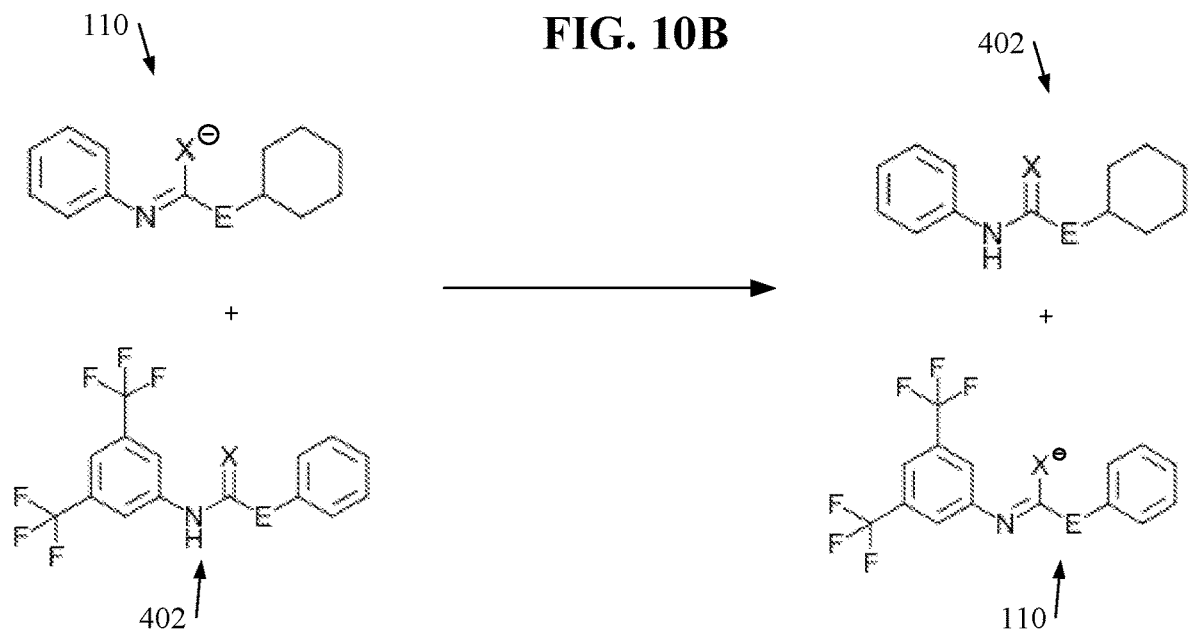
FIG. 10B illustrates a diagram of an example, non-limiting proton transfer that can facilitate switching from one anionic catalyst to another anionic catalyst to facilitate multiple ring-opening reactions within one or more flow reactors in accordance with one or more embodiments described herein.

FIG. 10B illustrates a diagram of an example, non-limiting protonation that can occur in the polymerization depicted in FIG. 10A in accordance with one or more embodiments described herein. Repetitive description of like elements employed in other embodiments described herein is omitted for sake of brevity. FIG. 10B can depict an exemplary catalyst switch that can facilitate the polymerization depicted in FIG. 10A. Because the active catalysts are anions, they can be protonated by neutral chemical compounds (e.g., first chemical compounds 402, second chemical compounds 406, third chemical compounds 410, fourth chemical compounds 414, and/or fifth chemical compounds 418), the equilibrium of which can be dictated by their relative acidities. Therefore, adding a more acidic chemical compound (e.g., first chemical compounds 402, second chemical compounds 406, third chemical compounds 410, fourth chemical compounds 414, and/or fifth chemical compounds 418) to the anion of a more basic anionic catalyst (e.g., first anionic catalyst 110, second anionic catalyst 126, third anionic catalyst 204, fourth anionic catalyst 210, and/or fifth anionic catalyst 304) can protonate the more basic anion, and simultaneously generate a less active anionic catalyst (e.g., as shown in FIG. 10B), allowing for matching of the catalyst and monomer reactivity.

In traditional ROPs, a main challenge can exist when the blocks are made from monomers with very different reactivity. For example, the rate of LA polymerization has been observed to be ~250 times faster than VL. For instance, the use of a single anionic catalyst in flow for the synthesis of a VL50-LA50 block copolymer, can result in the residence time for the VL block being over 2 orders of magnitude longer than the LA block. This would potentially allow for transesterification of the polymer backbone as a result of using increased residence times and a more active anionic catalyst. However, the acidity-based reactivity of the anionic catalysts described herein can overcome these challenges. For example, more acidic anionic catalysts can lead to slower reactions, which was proposed to be due to the weaker nucleophilic activation of the initiator or propagating chain end. By selecting the appropriate catalysts for each cyclic monomer, comparable retention time of the blocks can be achieved and transesterification can be minimized. Since proton exchange should be much faster compared to the ring-opening of monomers, the chemical compound for the subsequent block can be injected into the reactor with the cyclic monomer, instead of through an additional dedicated inlet 112.

FIG. 11 illustrates a flow diagram of an example, non-limiting method 1100 that can facilitate the polymerization of polymers (e.g., homopolymers and/or block copolymers) via one or more ROP in one or more flow reactors 100 in accordance with one or more embodiments described herein.

Repetitive description of like elements employed in other embodiments described herein is omitted for sake of brevity.

At 1102 the method 1100 can comprise selecting one or more anionic organocatalysts from a plurality of anionic organocatalysts comprising based on a reactivity rate of one or more cyclic monomers. The one or more cyclic monomers can be lactone monomers 102, cyclic carbonate monomers 104, and/or the cyclic monomers depicted in FIG. 5B. For instance, the plurality of anionic organocatalysts can be characterized be differing respective catalytic activities. Thus, the selecting at 1102 can comprise selecting an anionic organocatalyst with similar reactivity as the subject one or more cyclic monomers. In one or more embodiments the one or more anionic catalysts selected at 1102 an be one or more first anionic catalysts 110 in accordance with the various embodiments described herein.

At 1104, the method 1100 can comprise polymerizing, via a ROP within one or more flow reactors 100, the one or more cyclic monomers in the presence of the selected one or more anionic organocatalysts (e.g., one or more first anionic catalysts 110). For example, the one or more selected anionic organocatalysts can be one or more of the exemplary first anionic catalysts presented in FIG. 6.

In one or more embodiments (e.g., regarding the polymerization of one or more block copolymers), the method 1100 can further comprise, at 1106, reacting, via a second ROP within the flow reactor 100, an intermediate polymer with a second cyclic monomer (e.g., a lactone monomer 102 and/or a cyclic carbonate monomer 104) in the presence of a chemical compound (e.g., one or more of the chemical compounds presented in FIG. 4) to form a block copolymer, wherein the intermediate polymer is formed from the polymerizing at 1104. The reacting at 1106 can comprise protonating the anionic organocatalyst (e.g., the active first anionic catalyst 110) via a proton transfer with the chemical compound to form another anionic organocatalyst, and wherein the newly formed anionic organocatalyst can be a catalyst to the second ROP. Additionally, the method 1100 can comprise injecting the second cyclic monomer and the chemical compound into a stream of reactants to facilitate the reacting at 1106, wherein the chemical reactants can comprise the intermediate polymer and/or the anionic organocatalyst.

FIG. 12 illustrates a flow diagram of an example, non-limiting method 1200 that can facilitate the polymerization of polymers (e.g., homopolymers and/or block copolymers) via one or more ROP in one or more flow reactors 100 in accordance with one or more embodiments described herein. Repetitive description of like elements employed in other embodiments described herein is omitted for sake of brevity.

At 1202 the method 1200 can comprise selecting one or more anionic organocatalysts from a plurality of anionic organocatalysts comprising based on a reactivity rate of one or more cyclic monomers. The one or more cyclic monomers can be lactone monomers 102, cyclic carbonate monomers 104, and/or the cyclic monomers depicted in FIG. 5B. For instance, the plurality of anionic organocatalysts can be characterized be differing respective catalytic activities. Thus, the selecting at 1202 can comprise selecting an anionic organocatalyst with similar reactivity as the subject one or more cyclic monomers. In one or more embodiments the one or more anionic catalysts selected at 1202 an be one or more second anionic catalysts 126 in accordance with the various embodiments described herein.

At 1204, the method 1200 can comprise polymerizing, via a ROP within one or more flow reactors 100, the one or more cyclic monomers in the presence of the selected one or more anionic organocatalysts (e.g., one or more second anionic catalysts 126). For example, the polymerizing at 1204 can be performed in accordance with the various features described herein with regards to the third polymerization scheme 124 and/or the fourth polymerization scheme 128.

In one or more embodiments (e.g., regarding the polymerization of one or more block copolymers), the method 1200 can further comprise, at 1206, reacting, via a second ROP within the flow reactor 100, an intermediate polymer with a second cyclic monomer (e.g., a lactone monomer 102 and/or a cyclic carbonate monomer 104) in the presence of a chemical compound (e.g., one or more of the chemical compounds presented in FIG. 4) to form a block copolymer, wherein the intermediate polymer is formed from the polymerizing at 1204. The reacting at 1206 can comprise protonating the anionic organocatalyst (e.g., the active second anionic catalyst 126) via a proton transfer with the chemical compound to form another anionic organocatalyst, and wherein the newly formed anionic organocatalyst can be a catalyst to the second ROP. Additionally, the method 1200 can comprise injecting the second cyclic monomer and the chemical compound into a stream of reactants to facilitate the reacting at 1206, wherein the chemical reactants can comprise the intermediate polymer and/or the anionic organocatalyst.

FIG. 13 illustrates a flow diagram of an example, non-limiting method 1300 that can facilitate the polymerization of polymers (e.g., homopolymers and/or block copolymers) via one or more ROP in one or more flow reactors 100 in accordance with one or more embodiments described herein. Repetitive description of like elements employed in other embodiments described herein is omitted for sake of brevity.

At 1302 the method 1300 can comprise selecting one or more anionic organocatalysts from a plurality of anionic organocatalysts comprising based on a reactivity rate of one or more cyclic monomers. The one or more cyclic monomers can be lactone monomers 102, cyclic carbonate monomers 104, and/or the cyclic monomers depicted in FIG. 5B. For instance, the plurality of anionic organocatalysts can be characterized be differing respective catalytic activities. Thus, the selecting at 1302 can comprise selecting an anionic organocatalyst with similar reactivity as the subject one or more cyclic monomers. In one or more embodiments the one or more anionic catalysts selected at 1302 an be one or more third anionic catalysts 204 in accordance with the various embodiments described herein.

At 1304, the method 1300 can comprise polymerizing, via a ROP within one or more flow reactors 100, the one or more cyclic monomers in the presence of the selected one or more anionic organocatalysts (e.g., one or more third anionic catalysts 204). For example, the polymerizing at 1304 can be performed in accordance with the various features described herein with regards to the fifth polymerization scheme 202 and/or the sixth polymerization scheme 206.

In one or more embodiments (e.g., regarding the polymerization of one or more block copolymers), the method 1300 can further comprise, at 1306, reacting, via a second ROP within the flow reactor 100, an intermediate polymer with a second cyclic monomer (e.g., a lactone monomer 102 and/or a cyclic carbonate monomer 104) in the presence of a chemical compound (e.g., one or more of the chemical compounds presented in FIG. 4) to form a block copolymer, wherein the intermediate polymer is formed from the polymerizing at 1304. The reacting at 1306 can comprise protonating the anionic organocatalyst (e.g., the active third anionic catalyst 204) via a proton transfer with the chemical compound to form another anionic organocatalyst, and wherein the newly formed anionic organocatalyst can be a catalyst to the second ROP. Additionally, the method 1300 can comprise injecting the second cyclic monomer and the chemical compound into a stream of reactants to facilitate the reacting at 1306, wherein the chemical reactants can comprise the intermediate polymer and/or the anionic organocatalyst.

FIG. 14 illustrates a flow diagram of an example, non-limiting method 1400 that can facilitate the polymerization of polymers (e.g., homopolymers and/or block copolymers) via one or more ROP in one or more flow reactors 100 in accordance with one or more embodiments described herein. Repetitive description of like elements employed in other embodiments described herein is omitted for sake of brevity.

At 1402 the method 1400 can comprise selecting one or more anionic organocatalysts from a plurality of anionic organocatalysts comprising based on a reactivity rate of one or more cyclic monomers. The one or more cyclic monomers can be lactone monomers 102, cyclic carbonate monomers 104, and/or the cyclic monomers depicted in FIG. 5B. For instance, the plurality of anionic organocatalysts can be characterized be differing respective catalytic activities. Thus, the selecting at 1402 can comprise selecting an anionic organocatalyst with similar reactivity as the subject one or more cyclic monomers. In one or more embodiments the one or more anionic catalysts selected at 1402 an be one or more fourth anionic catalysts 210 in accordance with the various embodiments described herein.

At 1404, the method 1400 can comprise polymerizing, via a ROP within one or more flow reactors 100, the one or more cyclic monomers in the presence of the selected one or more anionic organocatalysts (e.g., one or more fourth anionic catalysts 210). For example, the polymerizing at 1404 can be performed in accordance with the various features described herein with regards to the seventh polymerization scheme 208 and/or the eighth polymerization scheme 212.

In one or more embodiments (e.g., regarding the polymerization of one or more block copolymers), the method 1400 can further comprise, at 1406, reacting, via a second ROP within the flow reactor 100, an intermediate polymer with a second cyclic monomer (e.g., a lactone monomer 102 and/or a cyclic carbonate monomer 104) in the presence of a chemical compound (e.g., one or more of the chemical compounds presented in FIG. 4) to form a block copolymer, wherein the intermediate polymer is formed from the polymerizing at 1404. The reacting at 1406 can comprise protonating the anionic organocatalyst (e.g., the active fourth anionic catalyst 210) via a proton transfer with the chemical compound to form another anionic organocatalyst, and wherein the newly formed anionic organocatalyst can be a catalyst to the second ROP. Additionally, the method 1400 can comprise injecting the second cyclic monomer and the chemical compound into a stream of reactants to facilitate the reacting at 1406, wherein the chemical reactants can comprise the intermediate polymer and/or the anionic organocatalyst.

FIG. 15 illustrates a flow diagram of an example, non-limiting method 1500 that can facilitate the polymerization of polymers (e.g., homopolymers and/or block copolymers) via one or more ROP in one or more flow reactors 100 in accordance with one or more embodiments described herein. Repetitive description of like elements employed in other embodiments described herein is omitted for sake of brevity.

At 1502 the method 1500 can comprise selecting one or more anionic organocatalysts from a plurality of anionic organocatalysts comprising based on a reactivity rate of one or more cyclic monomers. The one or more cyclic monomers can be lactone monomers 102, cyclic carbonate monomers 104, and/or the cyclic monomers depicted in FIG. 5B. For instance, the plurality of anionic organocatalysts can be characterized be differing respective catalytic activities. Thus, the selecting at 1502 can comprise selecting an anionic organocatalyst with similar reactivity as the subject one or more cyclic monomers. In one or more embodiments the one or more anionic catalysts selected at 1502 an be one or more fifth anionic catalysts 304 in accordance with the various embodiments described herein.

At 1504, the method 1500 can comprise polymerizing, via a ROP within one or more flow reactors 100, the one or more cyclic monomers in the presence of the selected one or more anionic organocatalysts (e.g., one or more fifth anionic catalysts 304). For example, the polymerizing at 1504 can be performed in accordance with the various features described herein with regards to the ninth polymerization scheme 302 and/or the tenth polymerization scheme 306.

In one or more embodiments (e.g., regarding the polymerization of one or more block copolymers), the method 1500 can further comprise, at 1506, reacting, via a second ROP within the flow reactor 100, an intermediate polymer with a second cyclic monomer (e.g., a lactone monomer 102 and/or a cyclic carbonate monomer 104) in the presence of a chemical compound (e.g., one or more of the chemical compounds presented in FIG. 4) to form a block copolymer, wherein the intermediate polymer is formed from the polymerizing at 1504. The reacting at 1506 can comprise protonating the anionic organocatalyst (e.g., the active fifth anionic catalyst 304) via a proton transfer with the chemical compound to form another anionic organocatalyst, and wherein the newly formed anionic organocatalyst can be a catalyst to the second ROP. Additionally, the method 1500 can comprise injecting the second cyclic monomer and the chemical compound into a stream of reactants to facilitate the reacting at 1506, wherein the chemical reactants can comprise the intermediate polymer and/or the anionic organocatalyst.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

What has been described above include mere examples of systems, computer program products and computer-implemented methods. It is, of course, not possible to describe every conceivable combination of components, products and/or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:

polymerizing, via a ring-opening polymerization within a flow reactor, a cyclic monomer in the presence of an anionic organocatalyst characterized by a chemical structure:

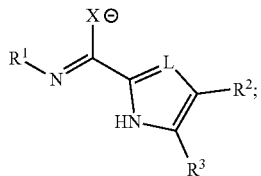

wherein X corresponds to an anion selected from a first group consisting of an oxygen anion, a sulfur anion, and a nitrogen anion;

wherein L corresponds to an atom selected from a second group consisting of a carbon atom and a nitrogen atom;

wherein $R^1$ corresponds to a first functional group selected from a third group consisting of a first alkyl group and a first aryl group;

wherein $R^2$ corresponds to a second functional group selected from a fourth group consisting of a second alkyl group and a second aryl group; and wherein $R^3$ corresponds to a third functional group selected from a fifth group consisting of a third alkyl group and a third aryl group.

2. The method of claim 1, wherein the cyclic monomer is selected from a sixth group consisting of a lactone monomer, a cyclic carbonate monomer, a substituted cyclic carbonate monomer, a cyclic phospholane monomer, a morpholinone monomer, tetrahydro-2H-pyran-2-thione, oxepane-2-thione, tetrahydrothiopyranone, and 2-thiepanone.

3. The method of claim 1, wherein the anionic organocatalyst is derived from a chemical reaction between a chemical compound and a chemical base, wherein the chemical base is selected from a sixth group consisting of 1,8-diazabicyclo[5.4.0]undec-7-ene, 7-methyl-1,5,7-triazabicyclo[4.4.0]dec-5-ene, phosphazene bases, 1,3,2-diazaphosphorin-2-amin, 2-[(1,1-dimethylethyl)imino]-N,N-diethyl-1,2,2,2,3,4,5,6-octahydro-1,3-dimethyl, 1,3-dihydro-1,3-bis(2,4,6-trimethylphenyl)imidazole-2-ylidene, potassium methoxide, potassium hydride, sodium methoxide, and sodium hydride.

4. The method of claim 1, further comprising:

reacting, via a second ring-opening polymerization within the flow reactor, an intermediate polymer with a second cyclic monomer in the presence of a chemical compound to form a block copolymer, and wherein the intermediate polymer is formed from the polymerizing the cyclic monomer.

5. The method of claim 4, wherein the reacting comprises protonating the anion via a proton transfer with the chemical compound to form a second anionic organocatalyst, and wherein the second anionic organocatalyst is a catalyst to the second ring-opening polymerization.

* * * * *